(12) United States Patent
Yamagishi et al.

(10) Patent No.: US 10,798,430 B2
(45) Date of Patent: Oct. 6, 2020

(54) RECEPTION DEVICE, RECEPTION METHOD, TRANSMISSION DEVICE, AND TRANSMISSION METHOD

(71) Applicant: Saturn Licensing LLC, New York, NY (US)

(72) Inventors: Yasuaki Yamagishi, Kanagawa (JP); Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/315,058

(22) PCT Filed: Jun. 5, 2015

(86) PCT No.: PCT/JP2015/066287
§ 371 (c)(1),
(2) Date: Nov. 30, 2016

(87) PCT Pub. No.: WO2015/194392
PCT Pub. Date: Dec. 23, 2015

(65) Prior Publication Data
US 2017/0195696 A1    Jul. 6, 2017

(30) Foreign Application Priority Data
Jun. 20, 2014 (JP) .................... 2014-127702

(51) Int. Cl.
*H04N 21/2343* (2011.01)
*H04N 21/435* (2011.01)
(Continued)

(52) U.S. Cl.
CPC ..... *H04N 21/2343* (2013.01); *H04N 21/2381* (2013.01); *H04N 21/25891* (2013.01);
(Continued)

(58) Field of Classification Search
None
See application file for complete search history.

(56) References Cited

U.S. PATENT DOCUMENTS 5,500,639 A * 3/1996 Walley .................. G08B 25/10
340/531
5,907,692 A * 5/1999 Wise ..................... G06F 9/3871
712/201

(Continued)

FOREIGN PATENT DOCUMENTS

EP    1 906 316 A1    4/2008
JP    2011-517876 A   6/2011

(Continued)

OTHER PUBLICATIONS

"Service Guide for Mobile Broadcast Services" Candidate Version 1.3, Open Mobile Alliance, Jan. 14, 2014, XP54190085A, 308 pages.

(Continued)

*Primary Examiner* — Nnenna N Ekpo
(74) *Attorney, Agent, or Firm* — Oblon, McClelland, Maier & Neustadt, L.L.P.

(57) ABSTRACT

The present technology relates to a reception device, a reception method, a transmission device, and a transmission method that make it possible to provide content according to a preference of a user. Provided is a reception device including: a tuning control unit configured to perform tuning control for tuning digital broadcasting using an Internet Protocol (IP) transmission scheme; and an acquisition control unit configured to perform acquisition control for acquiring content transmitted in the digital broadcasting according to a result of a matching process on a provider-side PDI-A indicating an answer set by a provider that provides content to a question on preference of a user included in transmission information transmitted in an upper (Continued)

layer of an IP layer of protocol layers of the IP transmission scheme and client-side PDI-A indicating an answer set by the user to the question in the digital broadcasting. The present technology can be applied to, for example, a television receiver set.

18 Claims, 35 Drawing Sheets

(51) Int. Cl.
- H04N 21/438 (2011.01)
- H04N 21/482 (2011.01)
- H04N 21/2381 (2011.01)
- H04N 21/258 (2011.01)

(52) U.S. Cl.
CPC ......... *H04N 21/435* (2013.01); *H04N 21/438* (2013.01); *H04N 21/482* (2013.01)

(56) References Cited

U.S. PATENT DOCUMENTS

| | | | | |
|---|---|---|---|---|
| 6,600,898 | B1* | 7/2003 | De Bonet | H04H 20/82 455/3.04 |
| 8,730,911 | B2* | 5/2014 | Chan | H04L 12/5692 370/331 |
| 2004/0068743 | A1* | 4/2004 | Parry | H04N 5/77 725/62 |
| 2005/0251725 | A1* | 11/2005 | Huang | H03M 13/2789 714/752 |
| 2008/0178219 | A1* | 7/2008 | Grannan | H04N 7/163 725/41 |
| 2009/0187943 | A1* | 7/2009 | McCarthy | G11B 27/034 725/46 |
| 2010/0114696 | A1* | 5/2010 | Yang | G06Q 30/02 705/14.49 |
| 2011/0096828 | A1* | 4/2011 | Chen | H04N 21/23106 375/240.02 |
| 2011/0107379 | A1* | 5/2011 | Lajoie | H04L 65/1016 725/87 |
| 2011/0154416 | A1* | 6/2011 | Kim | H04N 7/173 725/98 |
| 2012/0054214 | A1 | 3/2012 | Yamagishi et al. | |
| 2012/0054267 | A1* | 3/2012 | Yamagishi | H04N 21/4758 709/203 |
| 2012/0054783 | A1* | 3/2012 | Yamagishi | H04N 21/4758 725/13 |
| 2012/0143994 | A1* | 6/2012 | Calcev | G06F 17/30817 709/219 |
| 2012/0185888 | A1 | 7/2012 | Eyer et al. | |
| 2013/0060911 | A1* | 3/2013 | Nagaraj | H04N 21/234327 709/219 |
| 2013/0111520 | A1* | 5/2013 | Lo | H04L 67/306 725/35 |
| 2013/0226999 | A1 | 8/2013 | Sarieddine | |
| 2013/0254825 | A1* | 9/2013 | Mishra | H04L 41/5054 725/116 |
| 2013/0290493 | A1* | 10/2013 | Oyman | H04W 4/70 709/219 |
| 2014/0013375 | A1 | 1/2014 | Giladi | |
| 2014/0019635 | A1* | 1/2014 | Reznik | H04L 65/607 709/231 |
| 2014/0051315 | A9 | 2/2014 | Standaert et al. | |
| 2014/0068686 | A1* | 3/2014 | Oh | H04N 21/25891 725/93 |
| 2014/0089959 | A1 | 3/2014 | Oh et al. | |
| 2014/0201323 | A1* | 7/2014 | Fall | H04L 67/10 709/217 |
| 2014/0310518 | A1* | 10/2014 | Giladi | H04N 21/2347 713/165 |
| 2014/0366070 | A1* | 12/2014 | Lee | H04N 21/4621 725/62 |
| 2015/0032855 | A1* | 1/2015 | Wang | H04L 65/60 709/219 |
| 2015/0081851 | A1* | 3/2015 | Oyman | H04W 74/0833 709/219 |
| 2016/0219094 | A1* | 7/2016 | Ye | H04L 67/02 |
| 2016/0269786 | A1* | 9/2016 | Lee | H04N 21/435 |
| 2016/0360269 | A1* | 12/2016 | An | H04N 21/462 |

FOREIGN PATENT DOCUMENTS

| | | |
|---|---|---|
| WO | 2009/110767 A2 | 9/2009 |
| WO | 2012/029569 A1 | 3/2012 |
| WO | 2014/057896 A1 | 4/2014 |
| WO | WO 2015/099331 A1 | 7/2015 |

OTHER PUBLICATIONS

"3GPP TS 26.247 V12.0.0" 3$^{rd}$ Generation Partnership Project; Technical Specification Group Services and System Aspects; Transparent end-to-end Packet-switched Streaming Service (PSS); Progressive Download and Dynamic Adaptive Streaming over HTTP (3GP-DASH)(Release12), Sep. 2013, XP50712355A, 114 pages.
"Information technology—Dynamic adaptive streaming over HTTP (DASH)—Part 1: Media presentation description and segment formats", ISO/IEC 23009-1, First edition, Apr. 1, 2012, pp. 01-126.
Japanese Office Action dated Apr. 9, 2019 in Patent Application No. 2016-529235, 5 pages.

* cited by examiner

```
 1: <xs:schema xmlns:xs="http://www.w3.org/2001/XMLSchema" elementFormDefault="qualified"
    attributeFormDefault="unqualified">
 2:   <xs:element name="PDItable" type="PDItableType"/>
 3:   <xs:complexType name="PDItableType">
 4:     <xs:choice maxOccurs="unbounded">
 5:       <xs:element name="QIA" type="IntegerAnswerType"/>
 6:       <xs:element name="QBA" type="BooleanAnswerType"/>
 7:       <xs:element name="QSA" type="SelectionAnswerType"/>
 8:       <xs:element name="QTA" type="TextAnswerType"/>
 9:       <xs:element name="QAA" type="AnyAnswerType"/>
10:     </xs:choice>
11:     <xs:attribute name="transactional" type="xs:boolean" use="optional"/>
12:   </xs:complexType>
13:   <xs:complexType name="IntegerAnswerType">
14:     <xs:sequence>
15:       <xs:element name="id" type="xs:anyURI"/>
16:       <xs:element name="q" type="xs:string" minOccurs="0"/>
17:       <xs:element name="a" type="xs:integer" minOccurs="0"/>
18:     </xs:sequence>
19:     <xs:attribute name="minInclusive" type="xs:integer" use="optional"/>
20:     <xs:attribute name="maxInclusive" type="xs:integer" use="optional"/>
21:   </xs:complexType>
22:   <xs:complexType name="BooleanAnswerType">
23:     <xs:sequence>
24:       <xs:element name="id" type="xs:anyURI"/>
25:       <xs:element name="q" type="xs:string" minOccurs="0"/>
26:       <xs:element name="a" type="xs:boolean" minOccurs="0"/>
27:     </xs:sequence>
28:   </xs:complexType>
29:   <xs:complexType name="SelectionAnswerType">
30:     <xs:sequence>
31:       <xs:element name="id" type="xs:anyURI"/>
32:       <xs:element name="q" type="xs:string" minOccurs="0"/>
33:       <xs:element name="a" type="xs:string" minOccurs="0" maxOccurs="unbounded"/>
34:     </xs:sequence>
35:     <xs:attribute name="minChoice" type="xs:integer" use="optional"/>
36:     <xs:attribute name="maxChoice" type="xs:integer" use="optional"/>
37:   </xs:complexType>
38:   <xs:complexType name="TextAnswerType">
39:     <xs:sequence>
40:       <xs:element name="id" type="xs:anyURI"/>
41:       <xs:element name="q" type="xs:string" minOccurs="0"/>
42:       <xs:element name="a" type="xs:string" minOccurs="0"/>
43:     </xs:sequence>
44:   </xs:complexType>
45: </xs:schema>
```

FIG.8

```
<PDItable>
    <QSA minChoice="1">
        <id>ProviderA:123</id>
        <q>Which do you prefer, captions for adult or for children? </q>
        <a>For adults</a>
        <a>For children</a>
    </QSA>
</PDItable>
```

FIG.9

QUESTION: Which do you prefer, captions for adult or for children?

PLEASE SELECT ONE

For adults

For children

```
<PDItable >
    <QSA>
        <id>ProviderA:123</id>
        <q>Which do you prefer, captions for adult or for children? </q>
        <a>For adults</a>
    </QSA>
</PDItable>
```

FIG. 17

```
<MPD>
<Period>
...
<AdaptationSet @id=1 ...>
<EssentialProperty @schemeIdUri=urn:ATSC:PDIInstance @value=" <PDITable><QSA><id>ProviderA:123</id><q>Which do you prefer, captions for adult or for children? </q><a>For adults</a></QSA></PDITable>" >
</AdaptationSet>
<AdaptationSet @id=2 ...>
<EssentialProperty @schemeIdUri=urn:ATSC:PDIReference @value=" http://a.com/thePdi.pdi" >
</AdaptationSet>
...
</Period>
</MPD>
```

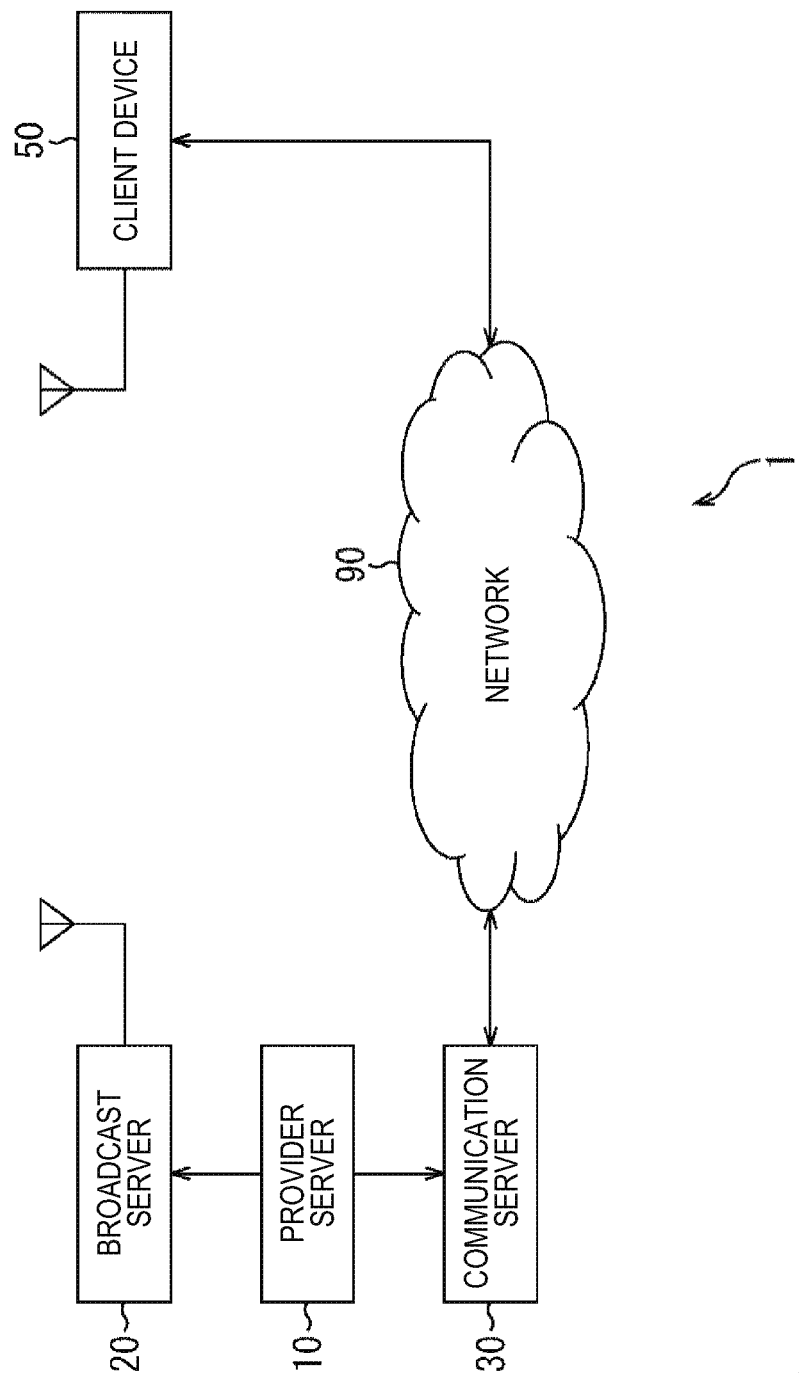

FIG. 26

```
Service
    id
    version
    validFrom
    validTo
    globalServiceID
    weight
    baseCID
    ServiceType
    Name
    Description
    AudioLanguage
        languageSDPTag
    TextLanguage
        languageSDPTag
    ParentalRating
        ratingSystem
        ratingValueName
    Genre
    Extension
        uri
        Description
    PreviewDataReference
        idRef
        usage
    PrivateExt
            PDI-A
```

FIG. 27

```
Schedule
    id
    version
    defaultSchedule
    onDemand
    validFrom
    validTo
    ServiceReference
        idRef
    ContentReference
        idRef
        contentLocation
        PresentationWindow
            startTime
            endTime
    PrivateExt
            PDI-A
```

FIG. 28

```
Content
    id
    version
    validFrom
    validTo
    globalContentID
    baseCID
    ServiceReference
        idRef
        weight
    Name
    Description
    SteatTime
    EndTime
    AudioLanguage
        languageSDPTag
    TextLanguage
        languageSDPTag
    Legth
    ParentalRating
        ratingSystem
        ratingValueName
    Genre
    Extension
        uri
        Description
    PreviewDataReference
        idRef
        usage
    PrivateExt
            PDI-A
```

RECEPTION DEVICE, RECEPTION METHOD, TRANSMISSION DEVICE, AND TRANSMISSION METHOD

CROSS REFERENCE TO RELATED APPLICATIONS

This application is a U.S. National Phase of International Patent Application No. PCT/JP2015/066287 filed on Jun. 5, 2015, which claims priority benefit of Japanese Patent Application No. JP 2014-127702 filed in the Japan Patent Office on Jun. 20, 2014. Each of the above-referenced applications is hereby incorporated herein by reference in its entirety.

TECHNICAL FIELD

The present technology relates to a reception device, a reception method, a transmission device, and a transmission method, and particularly to a reception device, a reception method, a transmission device, and a transmission method which cause content to be provided according to a preference of a user.

BACKGROUND ART

Current trends in standardization of Internet streaming of Internet Protocol Televisions (IPTVs) and the like include standardization of schemes to be applied to Video On Demand (VoD) streaming and live streaming based on Hypertext Transfer Protocol (HTTP) streaming. Particularly, Moving Picture Expert Group-Dynamic Adaptive Streaming over HTTP (MPEG-DASH) for which ISO, IEC, and MPEG have set a standard has gained attention (for example, refer to Non-Patent Literature 1).

MPEG-DASH is for acquiring and reproducing stream data according to a metafile called a Media Presentation Description (MPD) and an address (a Uniform Resource Locator (URL)) of media data such as chunked audio, videos, or captions described in the metafile.

A plurality of candidate streams of media data with different attributes described in an MPD are enumerated in a Representation element or the like. An application that processes the MPD (for example, a stream player or the like) selects an optimal stream for a current network environment condition from the plurality of candidate streams, and the stream is acquired and reproduced. Then, if the network environment changes, an acquisition target stream is changed accordingly.

CITATION LIST

Non-Patent Literature

Non-Patent Literature 1: ISO/IEC 23009-1:2012 Information Technology Dynamic Adaptive Streaming over HTTP (DASH)

SUMMARY OF INVENTION

Technical Problem

However, although a Moving Picture Experts Group phase 2-Transport Stream (MPEG2-TS) scheme has been employed as a transmission method in digital broadcasting standards in many nations, it is assumed that a more advanced service will be provided in the future if an Internet Protocol (IP) transmission scheme in which IP packets that have been used in the communications field are used in digital broadcasting is introduced. In addition, when the IP transmission scheme is introduced, it is assumed that control information of streams, e.g., an MPD, will be used as signaling information.

In addition, it is assumed in digital broadcasting in which the IP transmission scheme is used that there are demands for enabling content to be provided according to a preference of a user, however, no technical method for providing content according to a preference of a user has been established so far.

The present technology takes the above circumstances into consideration, and aims to make it possible to provide content according to a preference of a user.

Solution to Problem

A reception device according to a first aspect of the present technology is a reception device including: a tuning control unit configured to perform tuning control for tuning digital broadcasting using an Internet Protocol (IP) transmission scheme; and an acquisition control unit configured to perform acquisition control for acquiring content transmitted in the digital broadcasting according to a result of a matching process on first answer information indicating an answer set by a provider that provides content to a question on preference of a user included in transmission information transmitted in an upper layer of an IP layer of protocol layers of the IP transmission scheme and second answer information indicating an answer set by the user to the question in the digital broadcasting.

The transmission information can include question information indicating the question on the preference of the user, and the reception device can further include an answer generation unit configured to generate the second answer information corresponding to the question information.

The transmission information can be signaling information including control information of a stream of the content.

The signaling information can correspond to a Media Presentation Description (MPD) stipulated in a standard of Moving Picture Expert Group-Dynamic Adaptive Streaming over HTTP (MPEG-DASH).

The first answer information can be designated in the MPD by an element that stipulates the substance of the first answer information or a reference source.

The element that stipulates the substance of the first answer information or the reference source can be an EssentialProperty element or a SupplementalProperty element stipulated in the MPD.

The transmission information can be program information with regard to the content.

The program information can correspond to an Electronic Service Guide (ESG) stipulated in a standard of Open Mobile Alliance (OMA).

The first answer information can be stored in a newly stipulated element among elements constituting the ESG in at least one fragment of a Service fragment, a Schedule fragment, and a Content fragment.

A reception device may be an independent device, or an internal block constituting one device.

A reception method according to the first aspect of the present technology is a reception method corresponding to the reception device according to the first aspect of the present technology.

In the reception device and the reception method according to the first aspect of the present technology, tuning control for tuning digital broadcasting using an Internet Protocol (IP) transmission scheme is performed, and acquisition control for acquiring content transmitted in the digital broadcasting according to a result of a matching process on first answer information indicating an answer set by a provider that provides content to a question on preference of a user included in transmission information transmitted in an upper layer of an IP layer of protocol layers of the IP transmission scheme and second answer information indicating an answer set by the user to the question in the digital broadcasting is performed.

A transmission device according to a second aspect of the present technology is a transmission device including: an acquisition unit configured to acquire content; a transmission information generation unit configured to generate, as transmission information transmitted in an upper layer of an IP layer of protocol layers of an IP transmission scheme, the transmission information including first answer information that is first answer information indicating an answer set by a provider that provides the content to a question on preference of a user and is used in a matching process with second answer information indicating an answer set by the user to the question; and a transmission unit configured to transmit the transmission information including the first answer information along with the content on a digital broadcast signal using the IP transmission scheme.

The transmission information generation unit can generate the transmission information including question information indicating the question on the preference of the user, and the transmission unit can transmit the transmission information including the question information.

The transmission information can be signaling information including control information of a stream of the content.

The signaling information can correspond to an MPD stipulated in a standard of MPEG-DASH.

The first answer information can be designated in the MPD by an element that stipulates the substance of the first answer information or a reference source.

The element that stipulates the substance of the first answer information or the reference source can be an EssentialProperty element or a SupplementalProperty element stipulated in the MPD.

The transmission information can be program information with regard to the content.

The program information can correspond to an ESG stipulated in a standard of OMA.

The first answer information can be stored in a newly stipulated element among elements constituting the ESG in at least one fragment of a Service fragment, a Schedule fragment, and a Content fragment.

A transmission device may be an independent device, or an internal block constituting one device.

A transmission method according to the second aspect of the present technology is a transmission method corresponding to the transmission device according to the second aspect of the present technology.

In the transmission device and the transmission method according to the second aspect of the present technology, content is acquired, as transmission information transmitted in an upper layer of an IP layer of protocol layers of an IP transmission scheme, the transmission information including first answer information that is first answer information indicating an answer set by a provider that provides the content to a question on preference of a user and is used in a matching process with second answer information indicating an answer set by the user to the question is generated, and the transmission information including the first answer information is transmitted along with the content on a digital broadcast signal using the IP transmission scheme.

Advantageous Effects of Invention

According to the first and the second aspects of the present technology, content can be provided according to a preference of a user.

Note that the effects described here are not necessarily limited, and any effect that is desired to be described in the present disclosure may be exhibited.

BRIEF DESCRIPTION OF DRAWINGS

FIG. 1 is a diagram showing a protocol stack of 3GPP-MBMS.

FIG. 7 is a diagram showing an example of a schema of a PDI-Q.

FIG. 8 is a diagram showing an example of a description of the PDI-Q.

FIG. 9 is a diagram showing an example of display of a question and an answer defined in the PDI-Q.

FIG. 17 is a diagram showing an example of a description of an MPD.

FIG. 18 is a diagram showing an example of a configuration of a broadcast communication system according to a first embodiment.

FIG. 26 is a diagram showing an example of a configuration of a Service fragment.

FIG. 27 is a diagram showing an example of a configuration of a Schedule fragment.

FIG. 28 is a diagram showing an example of a configuration of a content fragment.

DESCRIPTION OF EMBODIMENT(S)

Figure 2:
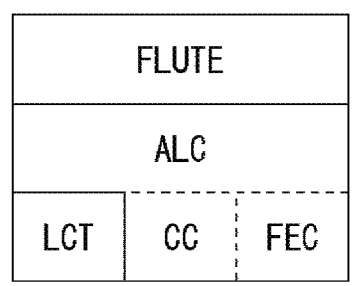
FIG. 2 is a diagram showing a structure of FLUTE.

Hereinafter, embodiments of the present technology will be described with reference to the drawings. Note that description will be provided in the following order.
1. Overview of digital broadcasting based on IP transmission scheme
2. Overview of PDI
3. First Embodiment
 (1) Structure of MPD
 (2) System configuration
 (3) Specific flow of processes of devices
4. Second Embodiment
 (1) Structure of ESG
 (2) System configuration
 (3) Specific flow of processes of devices
5. Modified example
6. Configuration of computer 1. Overview of Digital Broadcasting Based on IP Transmission Scheme An overview of digital broadcasting based on the Internet Protocol (IP) transmission scheme will be described below, and an overview of Third Generation Partnership Project-Multimedia Broadcast Multicast Service (3GPP-(e)MBMS) will be described here for comparison.
(Protocol Stack of 3GPP-MBMS)

Figure 1:
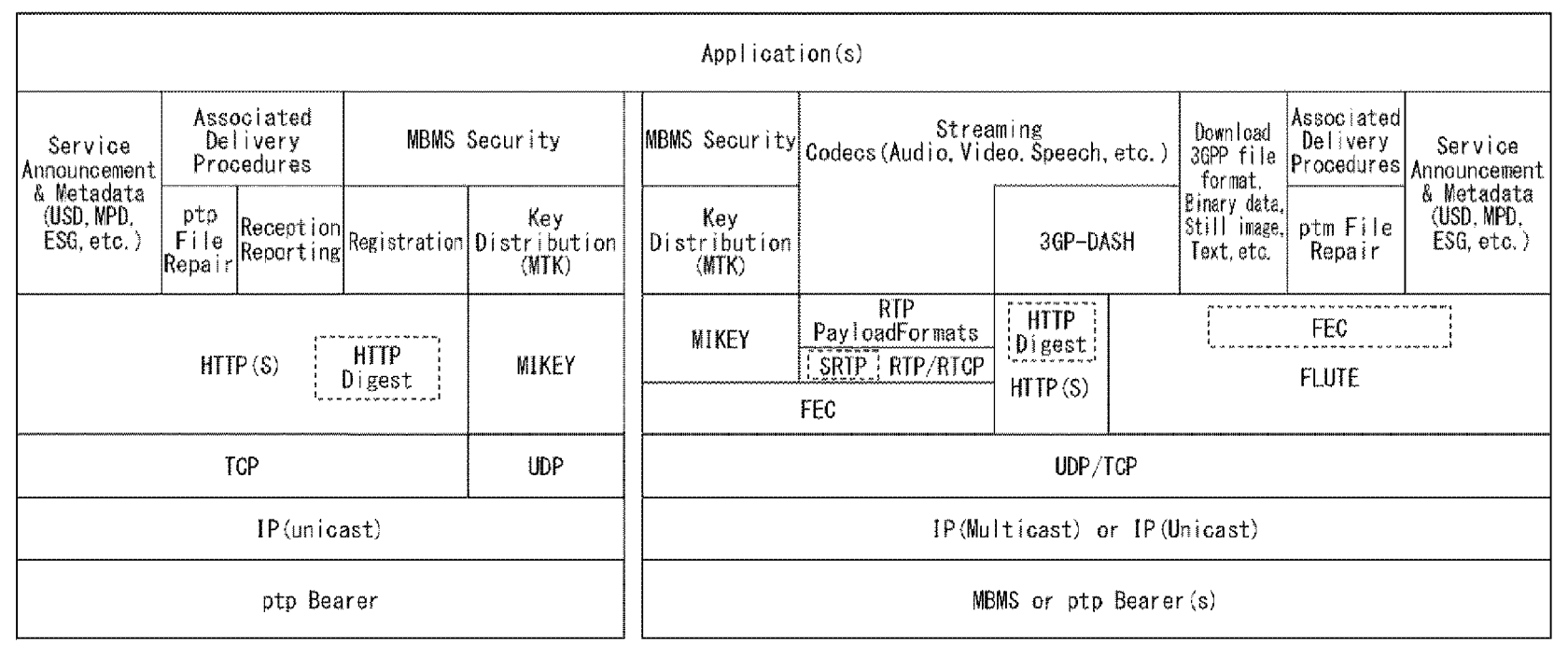

FIG. 1 is a diagram showing a protocol stack of 3GPP-MBMS.

In FIG. 1, the lowest layer is set for a physical layer (Physical Layer). In the case of transmission in 3GPP-MBMS using broadcasting shown on the right side of the drawing, the physical layer uses any of unidirectional MBMS or bidirectional ptp Bearer(s).

An upper layer neighboring the physical layer is set for an IP layer. In addition, an upper layer neighboring the IP layer is set for an UDP/TCP layer. That is, when MBMS is used as the physical layer, IP multicast is used in the IP layer, and User Datagram Protocol (UDP) is used in the UDP/TCP layer. On the other hand, when ptp Bearer(s) is used as the physical layer, IP unicast is used in the IP layer, and Transmission Control Protocol (TCP) is used in the UDP/TCP layer.

An upper layer neighboring the UDP/TCP layer is set for FEC, HTTP(S), and FLUTE. File Delivery over Unidirectional Transport (FLUTE) is a protocol for file transport in multicast. Note that Forward Error Correction (FEC) is applied to FLUTE. Details of FLUTE will be described below with reference to FIG. 2.

An upper layer neighboring the FLUTE is set for 3GP-DASH, Download 3GPP file format, etc., ptm File Repair, and Service Announcement & Metadata. In addition, an upper layer neighboring the ptm File Repair is set for Associated Delivery Procedures.

An upper layer neighboring 3GP-Dynamic Adaptive Streaming over HTTP (DASH) is set for stream data such as audio and videos. In other words, stream data such as audio and videos constituting content can be transmitted in a FLUTE session in units of media segments (Media Segment) based on the standard of ISO Base Media File Format (BMFF). In addition, in the Service Announcement & Metadata, a User Service Description (USD) and a Media Presentation Description (MPD) can be arranged as control information of stream data transmitted in the FLUTE session. Thus, the control information such as the USD and the MPD can also be transmitted in the FLUTE session. Furthermore, an Electronic Service Guide (ESG) can also be transmitted in the FLUTE session as an electronic service guide.

As described above, although a protocol for downloading a file based on a FLUTE session based on a 3GPP file format (of a ISO BMFF file or MP4 file) is stipulated in the 3GPP-MBMS, a fragmented MP4 file sequence of MPEG-DASH and an MPD based on the standard of MPEG-DASH can be transmitted using the same protocol. Note that the MPD is referred to by the USD likewise transmitted in the FLUTE session. In addition, fragmented MP4 means a fragmented MP4 file.

Note that an upper layer of the HTTP(S) that is an upper layer neighboring the UDP/TCP layer is set for stream data of 3GP-DASH. That is, stream data of 3GP-DASH can be transmitted using the HTTP(S). In addition, an upper layer of the FEC that is an upper layer neighboring the UDP/TCP layer is set for RTP/RTCP, and MIKEY. An upper layer of the RTP/RTCP is set for RTP PayloadFormats, and further an upper layer thereof is set for stream data. That is, stream data can be transmitted using a Real time Transport Protocol (RTP). An upper layer of the MIKEY is set for Key Distribution (MTK), and an upper layer thereof is set for MBMS Security.

On the other hand, in the case of transmission using a mobile telephone communication network shown on the left side of the drawing, a physical layer thereof is set to use only bidirectional ptp Bearer. An upper layer neighboring the physical layer is set for an IP layer. In addition, an upper layer neighboring the IP layer is set for a TCP layer, and further an upper layer neighboring the TCP layer is set for an HTTP(S) layer. That is, the protocol stack operable on a network such as the Internet is implemented with these layers.

An upper layer neighboring the HTTP(S) layer is set for Service Announcement & Metadata, ptm File Repair, Reception Reporting, and Registration. In the Service Announcement & Metadata, a USD and an MPD can be arranged as control information of stream data transmitted in a FLUTE session using broadcasting. Thus, control information such as the USD and the MPD can be provided by, for example, a server on the Internet. In addition, an ESG can be provided by a server on the Internet.

Note that an upper layer neighboring the ptm File Repair, and Reception Reporting is set for Associated Delivery Procedures. In addition, an upper layer neighboring the Registration is set for MBMS Security. Further, an upper layer of the UDP layer that is an upper layer neighboring the IP layer is set for MIKEY. An upper layer of the MIKEY is set for Key Distribution (MTK), and further an upper layer thereof is set for the MBMS Security. In addition, applications (Application(s)) can be transmitted using the FLUTE session in broadcasting or the TCP/IP protocol on a mobile telephone communication network.

(Structure of FLUTE)

FIG. 2 is a diagram showing a structure of File Delivery over Unidirectional Transport (FLUTE) of FIG. 1.

FLUTE is a specification of a protocol for file transport in multicast. As shown in FIG. 2, FLUTE is configured by a multicast protocol of scalable file objects called a File Delivery Table (FDT) and Asynchronous Layered Coding (ALC), and particularly, a combination of Layered Coding Transport (LCT) and Forward Error Correction (FEC) components that are building blocks thereof.

An FDT includes information such as location information (for example, a URL or the like), and a Transport Object Identifier (TOI), as index information of each Transport Session Identifier (TSI). In a FLUTE session, a file to be transmitted or the like is managed as one object with a TOI. In addition, a set of a plurality of objects is managed as one session with a TSI. That is, in a FLUTE session, a specific file can be designated using two pieces of identification information that are a TSI and a TOI. Note that an FDT corresponds to a File Delivery Description (FDD) to be described below.

(Protocol Stack for IP Transmission Scheme)

Figure 3:
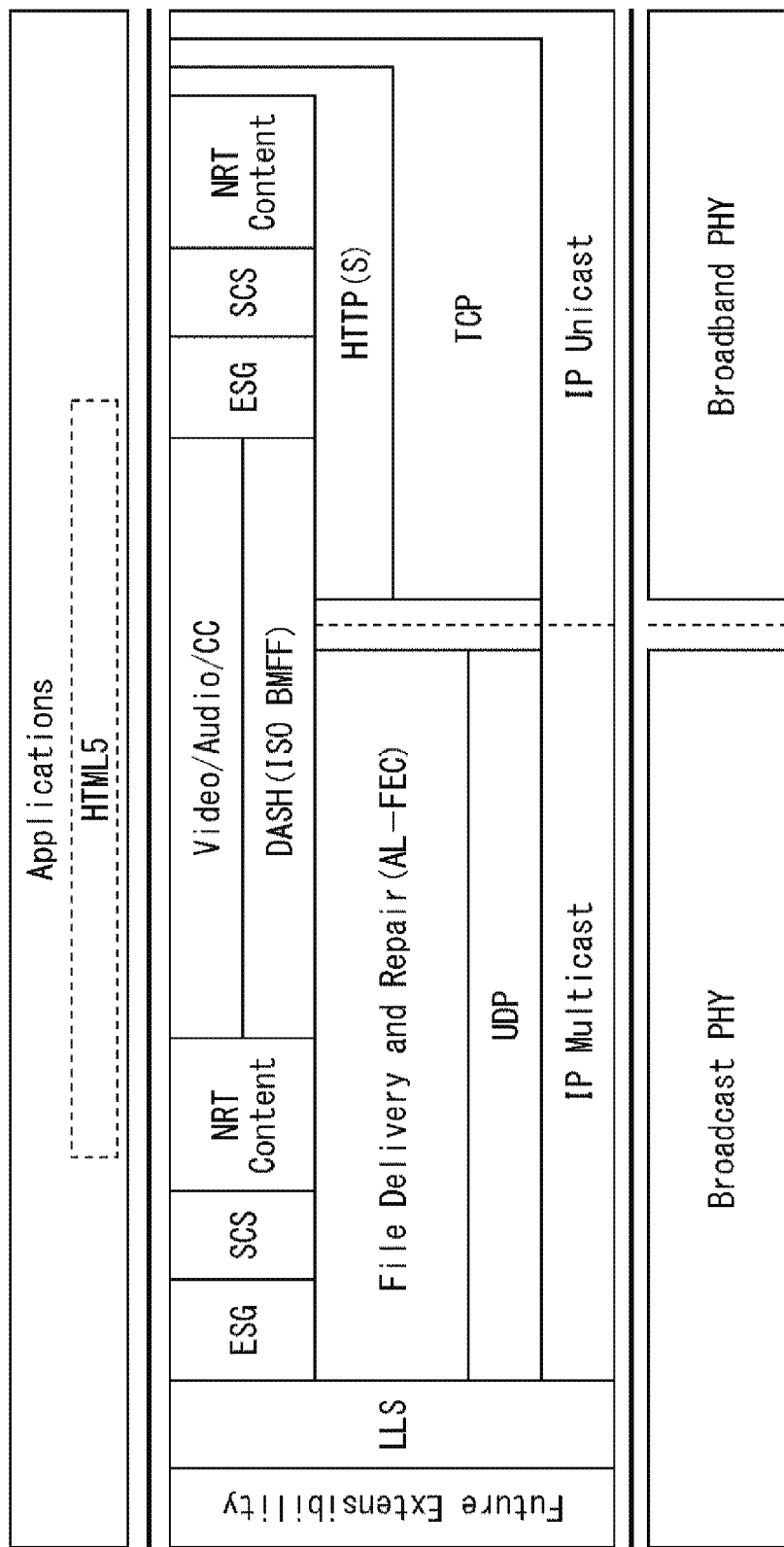
FIG. 3 is a diagram showing a protocol stack for an IP transmission scheme in digital broadcasting.

FIG. 3 is a diagram showing a protocol stack for the IP transmission scheme in digital broadcasting.

In FIG. 3, the lowermost layer is set for a physical layer (Physical Layer). In digital broadcasting of the IP transmission scheme, some data may be transmitted using communication, without being limited to transmit using broadcasting, but when broadcasting is used, its physical layer (Broadcast PHY) corresponds to a frequency band of broadcast waves allocated for a service (channel).

An upper layer of the physical layer is set for an IP layer. The IP layer is equivalent to Internet Protocol (IP) on a protocol stack of TCP/IP, and an IP packet is specified with an IP address. An upper layer neighboring the IP layer is set for a UDP layer, and a further upper layer thereof is set for File Delivery and Repair (AL-FEC). For this File Delivery and Repair, for example, File Delivery over Unidirectional Transport plus (FLUTE+) can be employed. That is, in digital broadcasting of the IP transmission scheme, packets with a designated IP address and port number of UDP are transmitted, and thus, for example, a FLUTE session is established.

Note that FLUTE+ is an extended version of FLUTE stipulated in the past, and details of FLUTE are stipulated as RFC 6726. In addition, "FLUTE plus" (FLUTE+) is sometimes called by other names, for example, "FLUTE enhancement" or the like.

Among upper layers neighboring the File Delivery and Repair, some layers are set for an Electronic Service Guide (ESG), Service Channel Signaling (SC S), and NRT content (NRT Content), and the ESG, the SCS, and the NRT content are transmitted in, for example, a FLUTE session. The ESG is an electronic service guide (program information). The NRT content is content transmitted in Non-Real Time (NRT) broadcasting, and is first accumulated in a storage of a receiver, and then reproduced. Note that the NRT content is an example of content, and a file of other content may be transmitted in the FLUTE session.

The SCS is signaling information of a unit of a service. As the SCS, for example, a User Service Description (USD), a Media Presentation Description (MPD), a Session Description Protocol (SDP), a File Delivery Description (FDD), and a Service Parameter Description (SPD) are transmitted.

The USD includes reference information for referring to signaling information of the MPD, the FDD, and the SDP. Note that the USD may be called a User Service Bundle Description (USBD). The MPD is control information of a stream that includes information of a segment URL or the like of each of streams (components) transmitted in units of services. The MPD is based on the standard of MPEG-DASH as described above.

The SDP includes a service attribute in units of services, composition information or attribute of a stream, filter information, location information, or the like. The FDD includes location information (for example, a URL or the like) or information of a TOI as index information of each TSI. Note that the FDD may be included in the USD as an element. In addition, the FDD corresponds to the File Delivery Table (FDT) described above. The SPD is configured to include various parameters stipulated at the level of a service.

Note that the USD, the MPD, the SDP, the FDD, and the SPD are described in a markup language, for example, Extensible Markup Language (XML) or the like.

Among the upper layers neighboring the File Delivery and Repair, a layer other than the above-described layer is set for DASH (ISO BMFF). In addition, an upper layer neighboring DASH (ISO BMFF) is set for stream data of components such as a video (Video) or audio (Audio), captions (Closed Caption (CC)), and the like. That is, stream data of components such as audio, a video, captions, and the like constituting content is transmitted in, for example, a FLUTE session in units of media segments (Media Segment) based on a standard of ISO Base Media File Format (BMFF).

Low Layer Signaling (LLS) is signaling information of a low layer, and is transmitted on a BBP stream. As LLS, for example, a Service Configuration Description (SCD), an Emergency Alerting Description (EAD), and a Region Rating Description (RRD) are transmitted.

The SCD employs an ID system that corresponds to an ID system that has been used in the MPEG2-TS scheme, and indicates a BBP stream configuration and a service configuration of a broadcasting network. In addition, the SCD includes attribute/setting information in units of services, SCS bootstrap information for accessing SCS, ESG bootstrap information for accessing ESG, and the like.

The EAD includes information regarding an emergency alert. The RRD includes rating information. Note that the SCD, the EAD, and the RRD are described in a markup language, for example, XML.

On the other hand, when communication is used, an upper layer of its physical layer (Broadband PHY) is set for an IP layer. In addition, an upper layer neighboring the IP layer is set for a TCP layer, and further an upper layer neighboring the TCP layer is set for an HTTP(S) layer. That is, with these layers, the protocol stack operable on a network such as the Internet is implemented.

Thereby, the receiver can perform communication using the TCP/IP protocol with, for example, a server on the Internet, and receive an ESG or SCS, NRT content, and the like. In addition, the receiver can receive stream data such as audio and videos that are adaptively streaming-distributed from the server on the Internet. Note that this streaming distribution is assumed to be based on the standard of MPEG-DASH.

In addition, applications (Applications) can be transmitted using, for example, a FLUTE session of broadcasting or the TCP/IP protocol of communication. Such applications can be described in a markup language such as HyperText Markup Language 5 (HTML5).

As described above, in digital broadcasting of the IP transmission scheme, the protocol stack of which a part corresponds to 3GPP-MBMS is employed. Accordingly, stream data such as audio or a video constituting content can be transmitted in units of media segments based on the standard of the ISO BMFF. In addition, even when signaling information such as an ESG or SCS is transmitted in either of broadcasting or communication, layers excluding the physical layer (and a data link layer) serving as a lower layer of the IP layers, i.e., the upper layers of the IP layers, can share a protocol, and thus the receiver or the like is expected to have a reduced burden of implementation or processing.

(Configuration of Broadcast Waves in IP Transmission Scheme)

Figure 4:
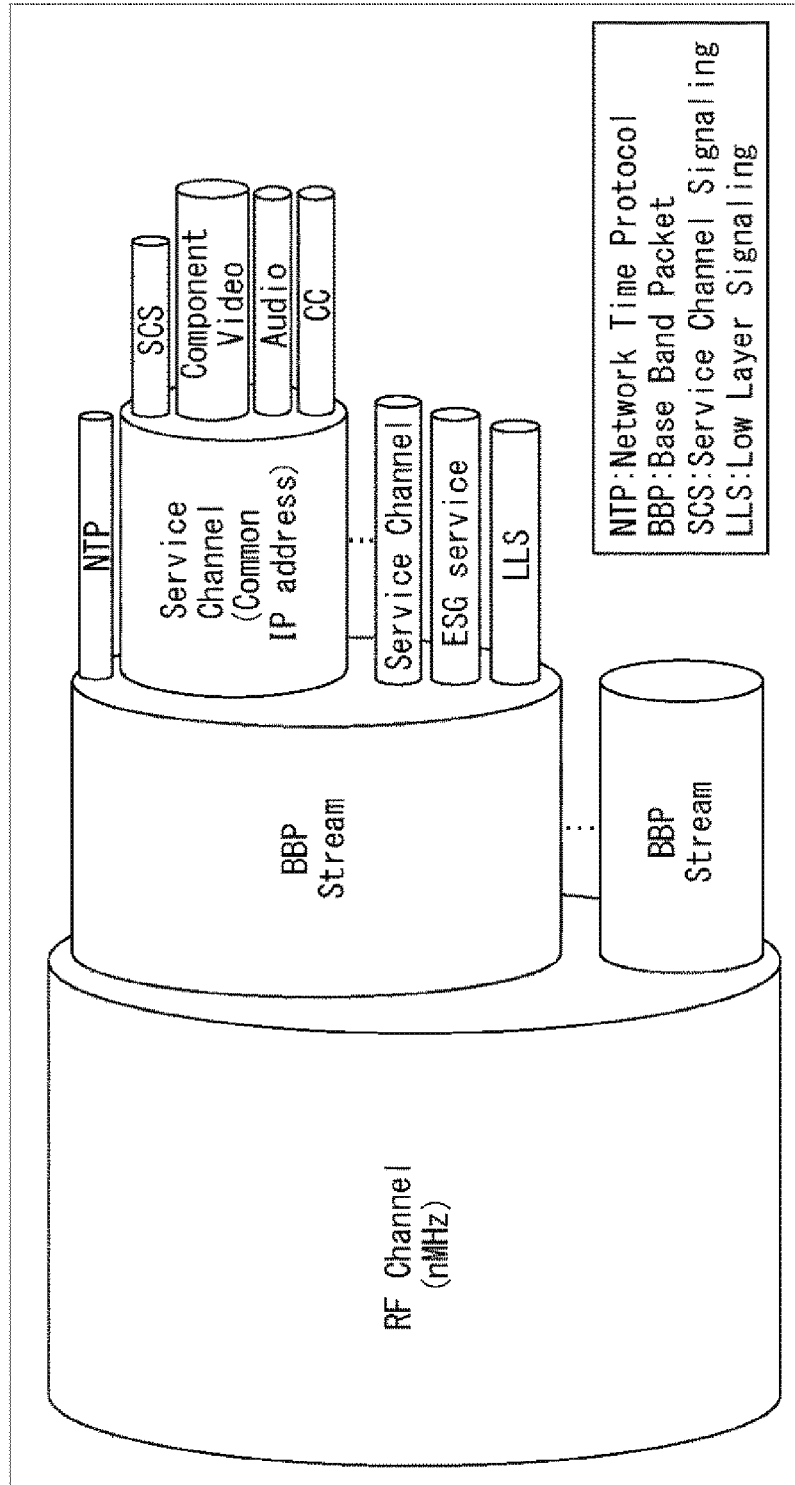
FIG. 4 is a diagram showing a configuration of broadcast waves of digital broadcasting in the IP transmission scheme.

FIG. 4 is a diagram showing a configuration of broadcast waves of digital broadcasting in the IP transmission scheme.

In FIG. 4, a plurality of BBP streams are transmitted in the broadcast waves (an RF Channel) having a predetermined frequency band. In addition, each of the BBP streams includes a Network Time Protocol (NTP), a plurality of service channels (Service Channels), an ESG Service (ESG), and LLS. Note that, although the NTP, the service channels, and the ESG are transmitted according to a UDP/IP protocol, the LLS is transmitted on the BBP stream. In addition, the NTP is time information, and can be shared by the plurality of service channels.

Each service channel (which will be referred to as a "service" hereinbelow) includes a component (Component) that is information constituting content (for example, a program), such as a video or audio, captions, or the like, and SCS such as a USD or an MPD. In addition, each service is given a common IP address, and using such an IP address, components, SCS, and the like can be made into a package for one or a plurality of services.

Here, an RF channel ID (RF_channel_id) is assigned to the broadcast waves (RF Channel) having the predetermined frequency band for, for example, each broadcast provider. In addition, a BBP stream ID (BBP_stream_id) is assigned to one or a plurality of BBP streams each transmitted on broadcast waves. Furthermore, a service ID (service_id) is assigned to one or a plurality of services transmitted in each BBP stream.

As described above, as the ID system of the IP transmission scheme, a configuration that corresponds to a combination of a network ID (network_id) used in the MPEG2-TS scheme, a transport stream ID (transport_stream_id), and a service ID (service_id) (which will be referred to as a "triplet" hereinbelow) is employed, and this triplet indicates a BBP stream configuration and a service configuration of a broadcasting network.

By using the ID system described above, matching with the MPEG2-TS scheme that has become widespread at present can be achieved, and thus it is possible to easily respond to simulcast at the time of, for example, a transition from the MPEG2-TS scheme to the IP transmission scheme. However, the RF channel ID and the BBP stream ID in the ID system of the IP transmission scheme are equivalent to a network ID and a transport stream ID of the MPEG2-TS scheme.

2. Overview of PDI

In a general content distribution service, if a filtering attribute that is set by a server on a provider side that provides content (a provider server) is given to content as metadata, a client device that receives the content performs filtering on the content. This filtering attribute is set as a value for an element of metadata selected from a metadata set defined by a standardization organization such as Advanced Television Systems Committee standards (ATSC) or Association of Radio Industries and Business (ARIB).

In other words, content that has been given a filtering attribute for which, for example, "target viewer" is selected as an element of the metadata and "teenagers" is set as a value for the element of the metadata is provided to a client device that performs filtering to acquire "content for teenage viewers."

However, metadata (a filtering attribute) that is not included in the metadata set defined by the standardization organization is not given to content. For example, even when a provider side desires to distribute "content whose target viewers are teenagers seeking employment," if "whether a viewer is seeking employment" is not included as an element of the metadata in the metadata set defined by the standardization organization, it is not possible to give a filtering attribute in which "seeking employment" is set to the content as an element of the metadata.

Thus, it is not possible for the provider side to distribute content to which interests of viewers are given as metadata according to immediate needs (considering, for example, a trend). On the other hand, in such a case, it is not possible for the client device to perform filtering to acquire such content according to immediate needs.

Here, as a technique for distributing content to which metadata according to needs of that time is attached, other than metadata defined by the standardization organization, there is Preference Demographic and Interest (PDI) employed in ATSC 2.0.

(Overall Image of PDI)

Figure 5:
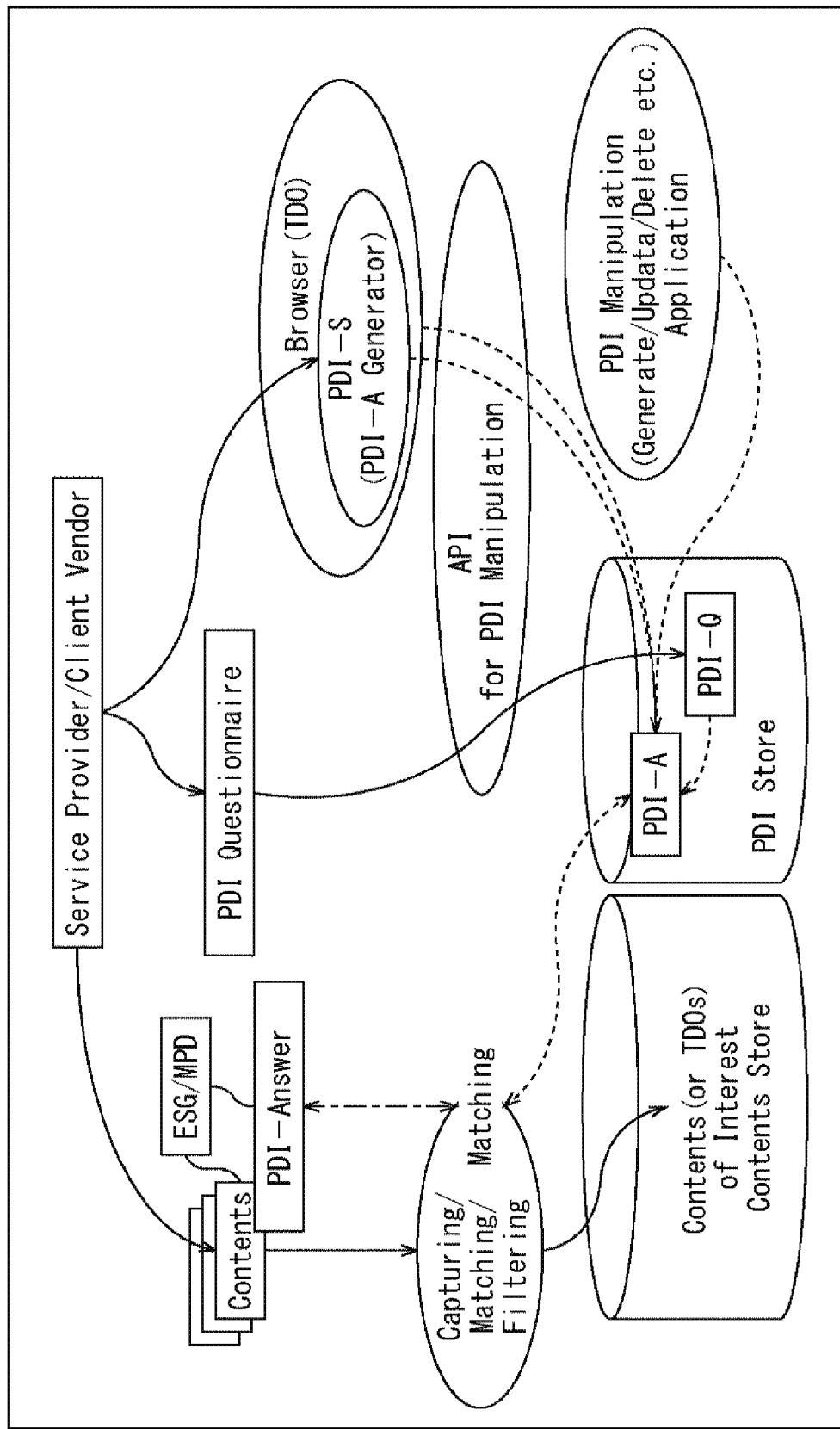
FIG. 5 is a diagram showing an overall image of PDI.

FIG. 5 is a diagram showing an overall image of PDI.

As shown in FIG. 5, a provider server generates a Preference Demographic and Interest-Question (Questionnaire) (PDI-Q) that is information indicating a question on a preference of a user who is using a client device and a Preference Demographic and Interest-Answer (PDI-A) (which will also be referred to as a "provider-side PDI-A" hereinbelow) that is information indicating an answer set by the provider to the question on the preference of the user, and transmits them to the client device. Note that, although details will be described below, the provider-side PDI-A can be transmitted to be included in an MPD or an ESG transmitted along with content.

Meanwhile, when the client device receives the PDI-Q, a PDI-A (which will also be referred to as a "client-side PDI-A" hereinbelow) that is information indicating an answer of the user to the question of the PDI-Q is generated and saved. Then, when the client device receives content distributed from the provider, the client device performs a matching process for the provider-side PDI-A from the provider and the saved client-side PDI-A, and only content for which the PDI-As match is reproduced (accumulated).

Note that parts that are not directly related to the present technology, like description with regard to a Triggered Declarative Object (TDO) as an application, are not described in FIG. 5. In addition, PDI-S is an abbreviation for Preference Demographic and Interest-Script, indicating a script for obtaining a client-side PDI-A.

(Details of Each Device that Processes PDI)

Figure 6:
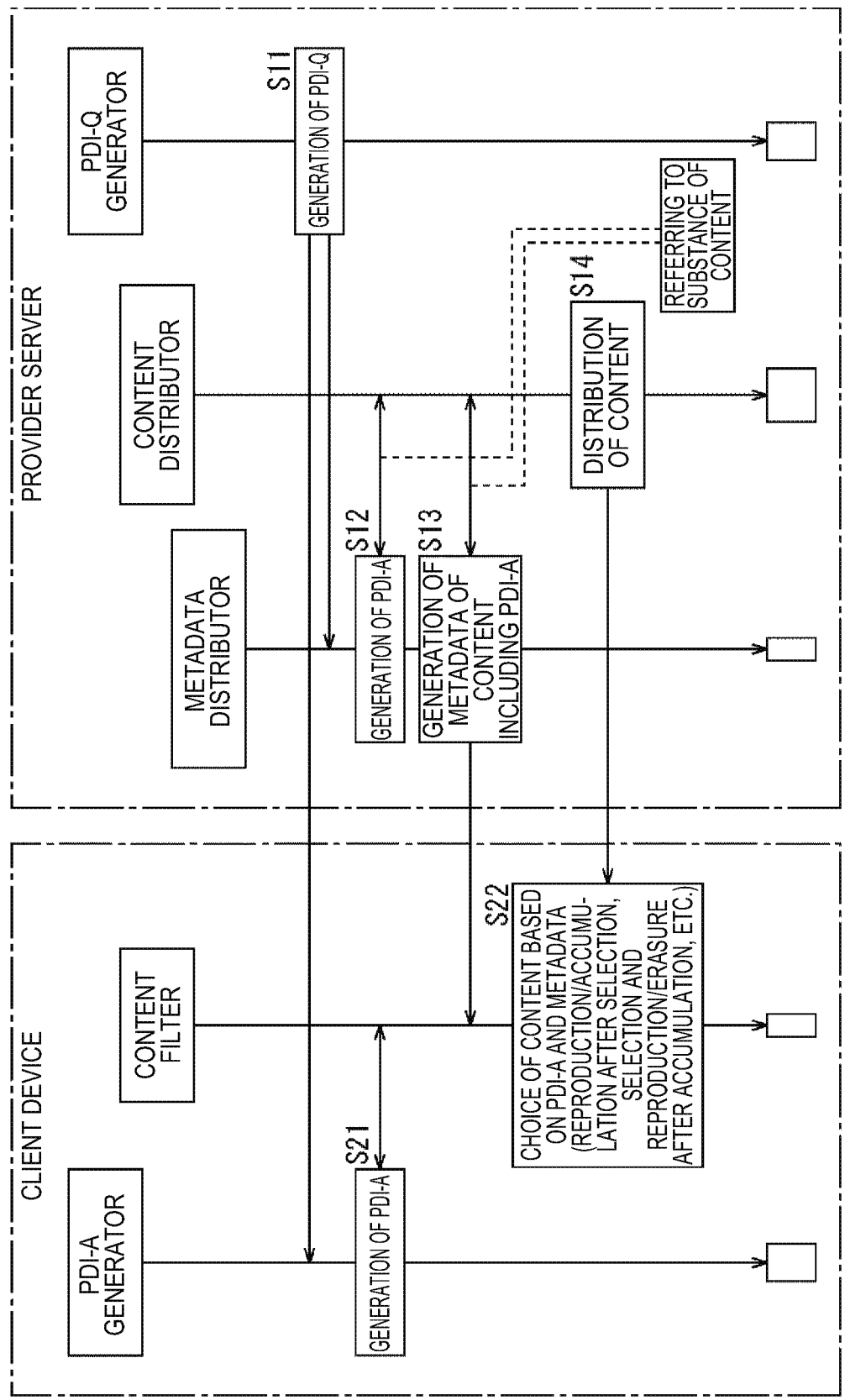
FIG. 6 is a diagram showing a data flow of constituent elements of respective devices that process PDI and a process sequence executed by the respective constituent elements.

FIG. 6 is a diagram showing a data flow of constituent elements of respective devices that process PDI and a process sequence executed by the respective constituent elements.

In FIG. 6, the provider server is constituted by a PDI-Q generator, a metadata distributor, and a content distributor. In addition, the client device is constituted by a PDI-A generator and a content filter.

The PDI-Q generator of the provider server generates a PDI-Q, and supplies it to the metadata distributor, and distributes it to a PDI-A generator of the client device (Step S11). The metadata distributor refers to the substance of content generated by the content distributor to set a preference of a user for whom the content is desired to be selected according to the substance of the question of the PDI-Q from the PDI-Q generator, and thereby generates a provider-side PDI-A (Step S12).

The metadata distributor of the provider server refers to the substance of the content generated by the content distributor to generate metadata of the content including the provider-side PDI-A (Step S13). The metadata distributor distributes the metadata including the provider-side PDI-A to a content filter of the client device (Step S13). In addition, the content distributor generates the content, and distributes it to the client device (Step S14).

The PDI-A generator of the client device generates a client-side PDI-A that is information indicating an answer of the user to the question of the PDI-Q distributed from the PDI-Q generator of the provider server, and supplies it to the content filter (Step S21).

The content filter of the client device filters (chooses) content optimal for the user from the content distributed from the content distributor of the provider server based on metadata including the client-side PDI-A supplied from the PDI-A generator of the client device and the provider-side PDI-A distributed from the metadata distributor of the provider server (Step S22).

Here, filtering is performed according not only to the substance of the metadata distributed from the metadata distributor of the provider server but also to a result of a matching process on the provider-side PDI-A and the client-side PDI-A included in the metadata, and only content for which the PDI-As match is reproduced (accumulated).

Note that the filtering of the content may be performed in real-time at the time of distribution of content and the selected content may be reproduced (accumulated), or, without applying filtering to content at the time of distribution thereof, all pieces of content distributed from the provider server may be accumulated in a background, filtering may be applied thereto, and content that is optimal for the user may be reproduced from the accumulated pieces of content. Alternatively, content unnecessary for the user may be deleted from the accumulated content.

Here, detailed structures of the PDI-Q and the PDI-A (Steps S11 and S12 of FIG. 6) generated by the provider server and the PDI-A (Step S21 of FIG. 6) generated by the client device will be described.

(Example of Schema of PDI-Q)

FIG. 7 is a diagram showing an example of a schema of Extensible Markup Language (XML) for defining a structure of a PDI-Q constituted by an XML document. Note that, for the sake of convenience in description, row numbers are given to respective rows in FIG. 7.

In FIG. 7, a $1^{st}$ row indicates a declaration or a definition for identifying the PDI-Q, and the $2^{nd}$ row indicates a declaration of a name and a type of the entire question defined as the PDI-Q.

The $3^{rd}$ row to the $12^{th}$ row indicate respective declarations of the names and the types of the question declared in the $2^{nd}$ row. Specifically, a type of a question "IntegerAnswerType" defined with a name of "QIA" in the $5^{th}$ row indicates that an answer to the question is of an integer-value type, and a type of a question "BooleanAnswerType" defined with a name of "QBA" in the $6^{th}$ row indicates that an answer to the question is of a logical-value type.

In addition, a type of a question "SelectionAnswerType" defined with a name of "QSA" in the $7^{th}$ row indicates that an answer to the question is of an answer candidate selection type, and a type of a question "TextAnswerType" defined with a name of "QTA" in the $8^{th}$ row indicates that an answer to the question is of a character string type. Furthermore, a type of a question "AnyAnswerType" defined with a name of "QAA" in the $9^{th}$ row indicates that there is no limitation on a type of an answer to the question.

The $13^{th}$ row to the $44^{th}$ row indicate declarations of elements of the respective questions defined with the names of "QIA," "QBA," "QSA," and "QTA" among the declared questions described above. Particularly, id elements indicated in the $15^{th}$, $24^{th}$, $31^{st}$, and $40^{th}$ rows represent IDs (identifiers) for identifying items of the respective questions, and are defined as "common: [category:]question-ID" as a first format.

In this first format, "common" indicates that a question identified with the id element is one defined in common regardless of a provider, "category" indicates a category of the question, and "question-ID" indicates an identifier of the question. Note that "category" may have a hierarchical nest structure when necessary, as in "common: [category1:category2:category3:□□□] question-ID."

In addition, an id element is defined as "providerName: [category:]question-ID" as a second format. In this second format, "providerName" indicates the name of the provider that has set a question identified with the id element. Note that "category" and "question-ID" are similar to those of the first format.

As described above, questions defined as PDI-Qs are distinguished as questions that do not depend on providers (that are in common among providers) that provide content and questions independently defined by providers that provide content according to the id elements.

Note that, although the XML schema for defining the structure of the PDI-Q has been described in FIG. 7, an XML schema for defining a structure of a PDI-A that is an answer to the question defined as the PDI-Q basically has a structure similar to that of the XML schema for defining the structure of the PDI-Q, and thus description thereof is omitted. In addition, the structure of the PDI-Q defined by the XML schema is not limited to the example shown in FIG. 7, and another structure can be employed.

(Example of Description of PDI-Q)

FIG. 8 is a diagram showing an example of a description of the PDI-Q generated by the PDI-Q generator of the provider server in Step S11 of FIG. 6.

In FIG. 8, an id element, a q element, and a elements are described between a start tag and an end tag of a QSA element to define a question for obtaining an answer of an answer candidate selection type. In addition, "1" is designated to a minChoice attribute of the QSA element, which means that the number of options to be answered is restricted to 1.

For the id element, "ProviderA:123" is described as an identifier of a set of a question and an answer candidate. For the q element, "Which do you prefer, captions for adult or for children?" is described as the question. For the a elements, "For adults" and "For children" are described as options for an answer to the question.

(Example of Display of Question and Answer)

FIG. 9 is a diagram showing an example of display of a screen (a user-interactive screen) for a question and an answer defined in the PDI-Q (of FIG. 8) received by the client device from the provider server in Step S21 of FIG. 6.

In FIG. 9, the question "Which do you prefer, captions for adult or for children?" is displayed corresponding to the described substance of the q element described between the start tag and the end tag of the PDI-Q of FIG. 8. In addition, the options for an answer that are "For adults" and "For children" are displayed below the question corresponding to the described substance of the a elements. The client device allows a user who has found the question to select any one option. That is, according to a result of user's selection of an option for an answer to the question, the PDI-A generator of the client device generates the client-side PDI-A.

Note that, also in Step S12 of FIG. 6, the interactive screen of FIG. 9 is displayed, and the metadata distributor of the provider server generates the provider-side PDI-A according to the result of the selection of the option for the answer to the provider's question.

(Example of Description of PDI-A)

Figure 10:
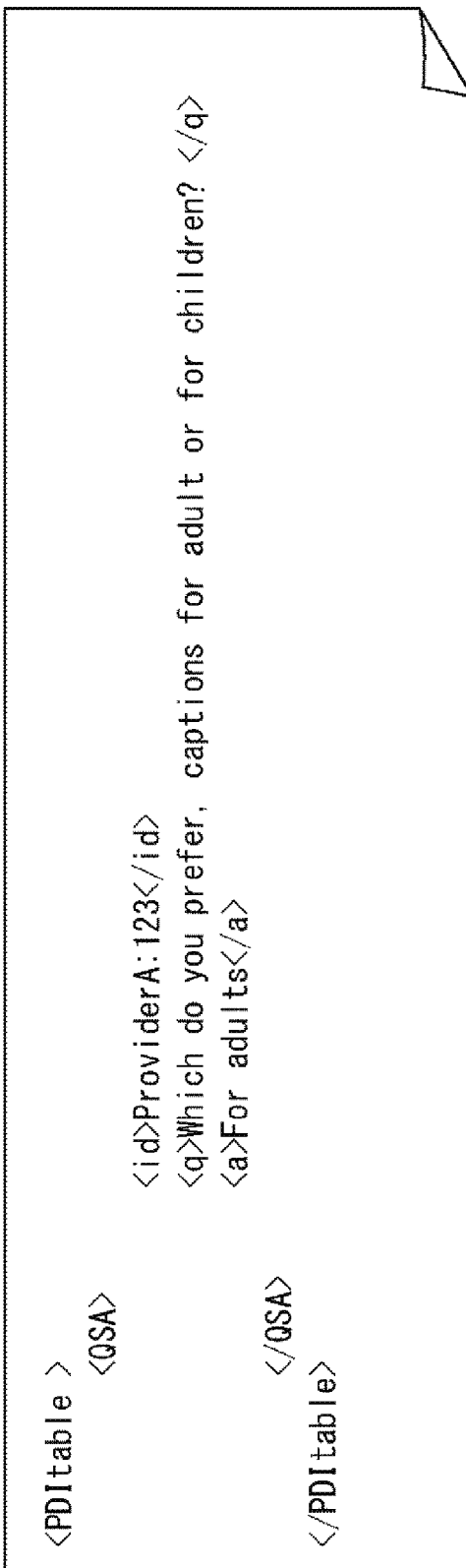
FIG. 10 is a diagram showing an example of a description of a PDI-A.

FIG. 10 is a diagram showing an example of a description of the client-side PDI-A generated by the PDI-A generator of the client device in Step S21 of FIG. 6.

In FIG. 10, an id element, a q element, and an a element are described between a start tag and an end tag of a QSA element, to define a question for obtaining an answer of an answer candidate selection type and the answer.

For the id element, "ProviderA:123" is described as an identifier of a set of the question and an answer candidate. For the q element, "Which do you prefer, captions for adult or for children?" is described as the question. For the a element, only "For adults" is described as an answer to the question.

That is, for the client-side PDI-A of FIG. 10, an example of a description when "For adults" has been selected from the options for an answer that are "For adults" and "For children" to the question "Which do you prefer, captions for adult or for children?" on the interactive screen of FIG. 9 is shown. Note that, when "For children" has been selected from the options for an answer on the interactive screen of FIG. 9, "For children" is described for the a element in the client-side PDI-A of FIG. 10, instead of "For adults."

(Filtering of Content)

Figure 11:
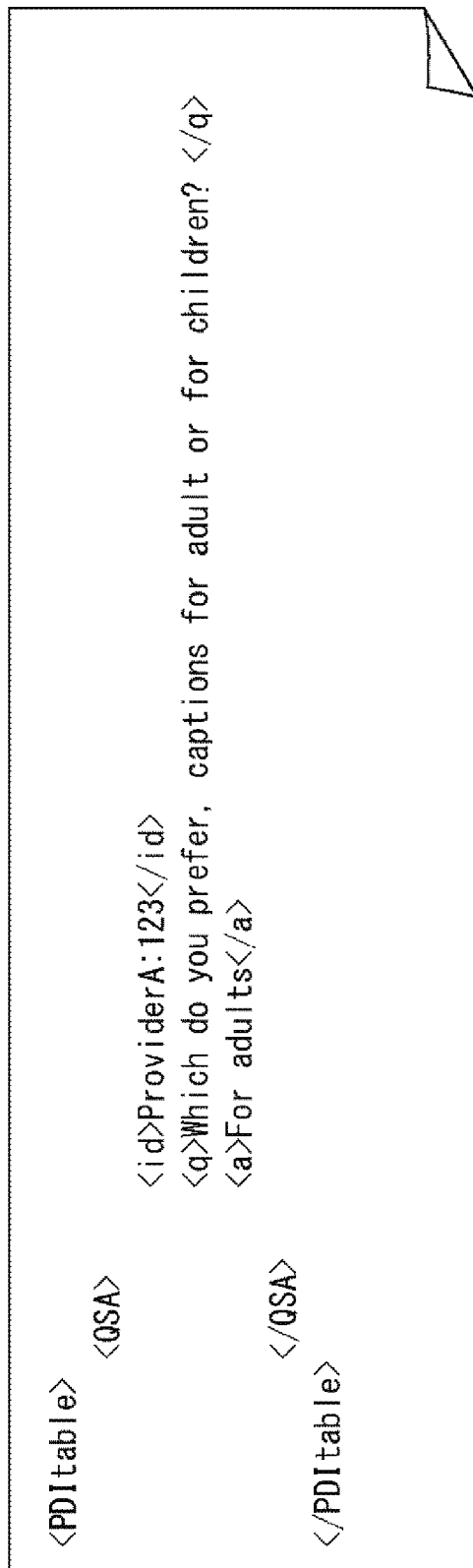
FIG. 11 is a diagram showing an example of a description of a PDI-A determined to match.
Figure 12:
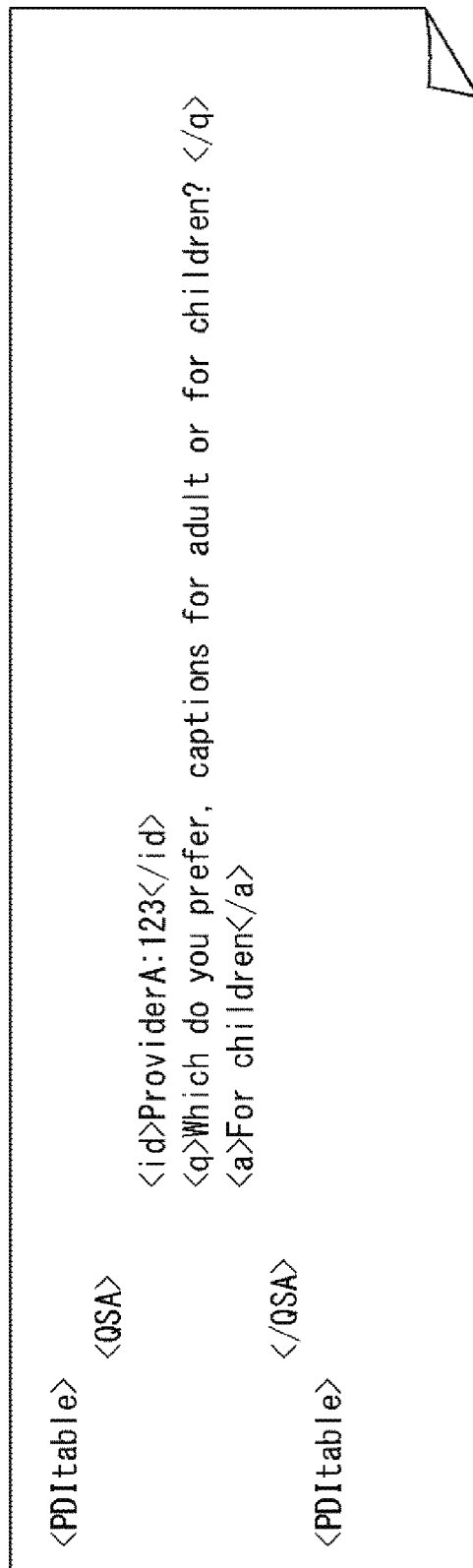
FIG. 12 is a diagram showing an example of a description of a PDI-A determined not to match.

Next, details of filtering of content that corresponds to Step S22 of FIG. 6 will be described. Here, a case in which a client-side PDI-A of FIG. 10 is generated as the client-side PDI-A in Step S21 of FIG. 6 will be described. In FIGS. 11 and 12, examples of a provider-side PDI-A included in metadata of content are shown.

Since "For adults" is described as an answer to the question in the provider-side PDI-A in FIG. 11, if the client device performs a matching process on the provider-side PDI-A (of FIG. 11) and the client-side PDI-A (of FIG. 10), the PDI-As are determined to match, and thus content to which metadata including the provider-side PDI-A (of FIG. 11) is attached is reproduced (accumulated).

That is, because the provider server distributes content targeting users who like captions for adults and the user of the client device likes captions for adults as well, the content is regarded as content optimal for the user, and thus reproduced.

On the other hand, since "For children" is described as an answer to the question in the provider-side PDI-A of FIG. 12, if the client device performs a matching process on the provider-side PDI-A (of FIG. 12) and the client-side PDI-A (of FIG. 10), the PDI-As are determined not to match, and thus content to which metadata including the provider-side PDI-A (of FIG. 12) is attached is not reproduced (accumulated).

That is, because the provider server distributes content targeting users who like captions for adults, but the user of the client device likes captions for children, the content is not regarded as content optimal for the user, and thus is not reproduced.

By employing PDI as described above, content to which metadata according to immediate needs is attached, other than metadata stipulated by a standardization organization, can be distributed. However, in digital broadcasting that employs the IP transmission scheme as described above, demands for enabling content to be provided according to preferences of a user are assumed. Thus, by employing PDI with which content with metadata attached according to immediate needs is distributed in digital broadcasting that employs the IP transmission scheme in the present technology, content can be provided according to preferences of a user. Detailed feasible methods thereof will be described below.

3. First Embodiment

In a first embodiment, by disposing Preference Demographic and Interest (PDI) in a Media Presentation Description (MPD) and providing the PDI to the client device from the provider server, content can be provided according to preferences of a user.

(1) Structure of MPD (Schema of MPD)

Figure 13:
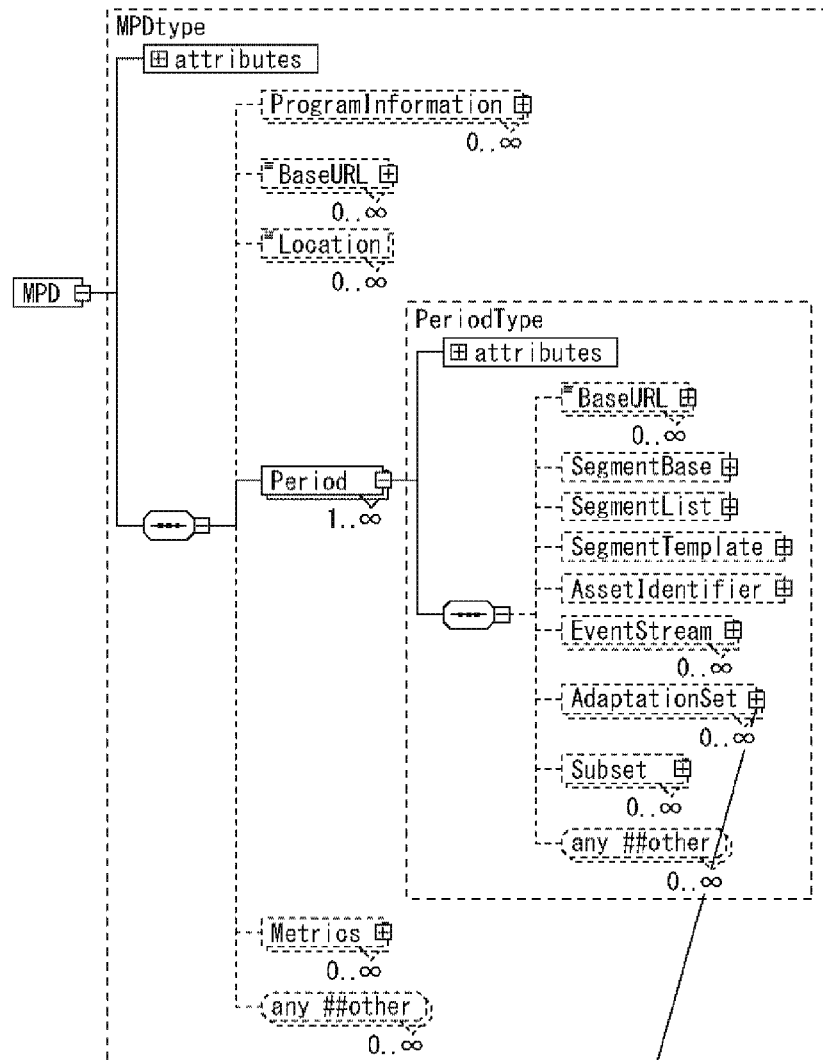
FIG. 13 is a diagram showing an example of a schema of an MPD.
Figure 14:
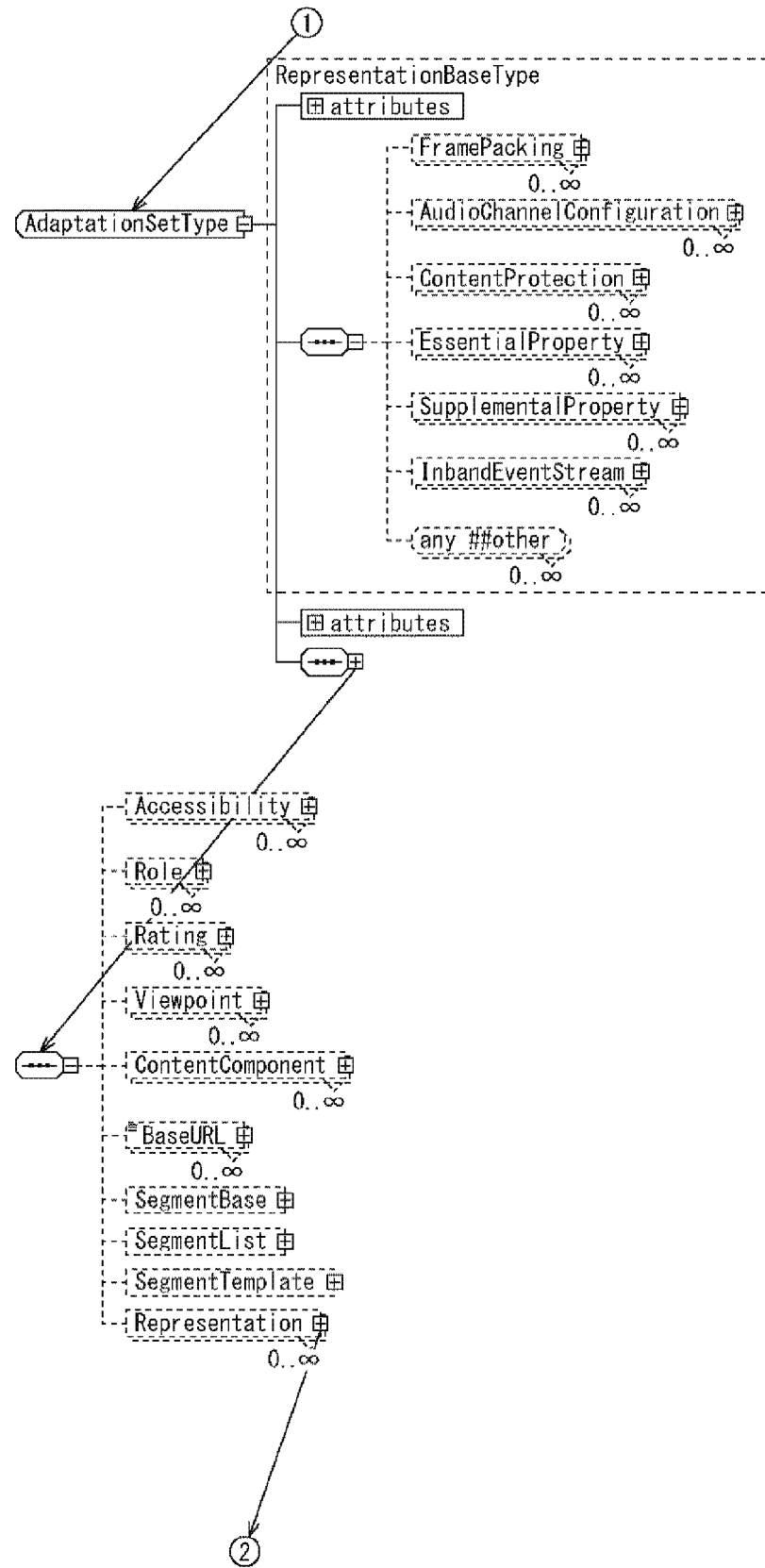
FIG. 14 is a diagram showing the example of the schema of the MPD.
Figure 15:
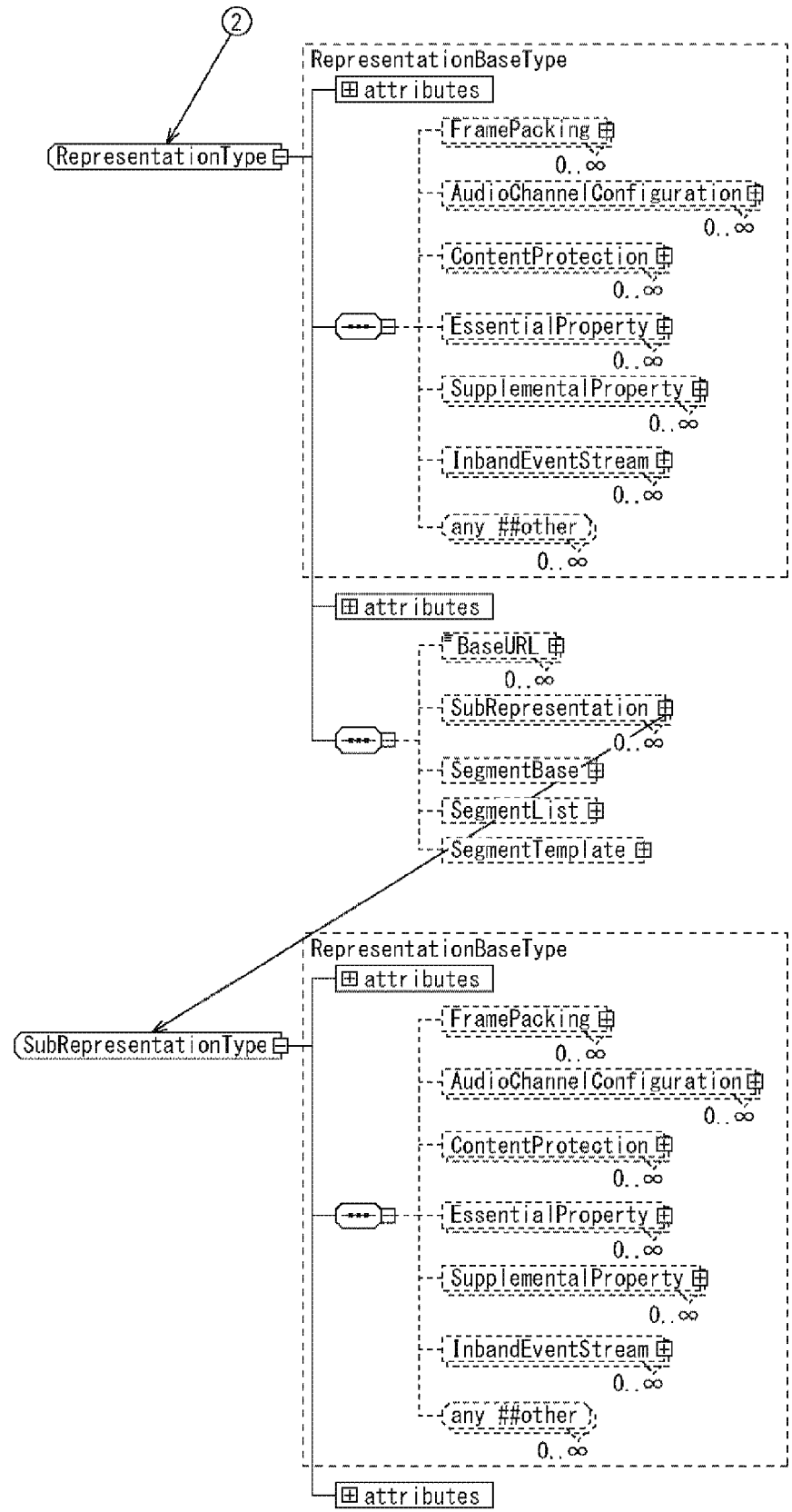
FIG. 15 is a diagram showing the example of the schema of the MPD.

FIGS. 13 to 15 are diagrams showing a schema of an MPD. Note that the MPD is described in a markup language, for example, XML or the like in a hierarchical structure.

In the MPD, a Period element (in FIG. 13), an AdaptationSet element (in FIG. 14), a Representation element (in FIG. 15), and a SubRepresentation element (in FIG. 15) are described in a hierarchical structure.

The Period element is a unit in which a configuration of content such as a program is described. In addition, the AdaptationSet element, the Representation element, or the SubRepresentation element is used in each stream of a component such as a video or audio, or captions constituting the content, in which an attribute of each stream can be described.

The AdaptationSet element corresponds not only to a single stream such as a video or audio stream but also to a stream obtained by multiplexing a plurality of streams. In the standard of MPEG-DASH, elements and attributes subordinate to the AdaptationSet element of FIG. 14 are stipulated as elements and attributes that can be included in the AdaptationSet element. In the AdaptationSet element, for example, an EssentialProperty element and a SupplementalProperty element that can define a new element can be described.

A Representation element can enumerate streams of components serving as a plurality of options with different parameters, for example, a bit rate, and the like, in the range of the AdaptationSet element serving as its upper-level element (parent element). Note that, since content is constituted by one or a plurality of components, the streams of content can be said to be enumerated here. As elements and attributes that can be included in the Representation element, elements and attributes subordinate to the Representation element of FIG. 15 are stipulated. Under the Representation element, for example, an EssentialProperty element and a SupplementalProperty element can be described as in the AdaptationSet element.

A SubRepresentation element can list streams of components serving as a plurality of options with different parameters, for example, a bit rate, and the like in the range of the Representation element serving as an upper element thereof. As elements and attributes that can be included in the SubRepresentation element, elements and attributes subordinate to the SubRepresentation element of FIG. 15 are stipulated. Under the SubRepresentation element, for example, an EssentialProperty element and a SupplementalProperty element can be described as in the AdaptationSet element and the Representation element.

(Structure of EssentialProperty Element)

Figure 16:
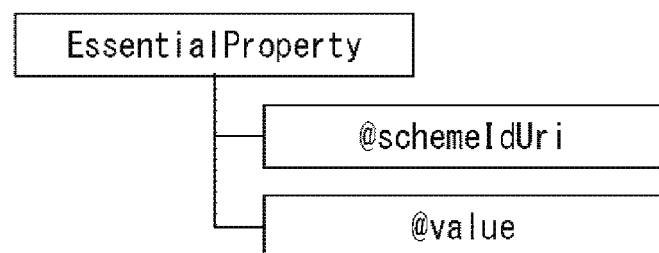
FIG. 16 is a diagram showing a structure of an Essential Property element.

FIG. 16 is a diagram showing a structure of an EssentialProperty element. The EssentialProperty element can be described as a lower-level element of the AdaptationSet element, the Representation element, or the SubRepresentation element.

As shown in FIG. 16, the EssentialProperty element is constituted by a schemeIdUri attribute and a value attribute of which a value is decided based on a format specified with a value of the schemeIdUri attribute (Uniform Resource Identifier (URI)). Note that the value attribute is set as an optional attribute. Using this EssentialProperty element, information with regard to the provider-side PDI-A is designated.

(First Designation Method)

As a first designation method of the provider-side PDI-A, "urn:ATSC" is defined as a name-space authority, and a Uri attribute value called "urn:ATSC:PDIInstance" stipulated by the authority is defined. Then, streams of content (components) enumerated under the AdaptationSet element having the EssentialProperty element with this Uri attribute value as a value of a schemeIdUri attribute are set to be reproduced (accumulated) only when the substance of a PDI instance (provider-side PDI-A) stored as a value attribute matches the substance of a PDI instance (client-side PDI-A) generated (saved) at the client device side.

For example, when the question "Which do you prefer, captions for adult or for children?" and the answer "For adults" as a value attribute of the EssentialProperty element is stored as a PDI instance, and the user of the client device selects "For adults" as the answer to the question, streams of content (components) enumerated under the corresponding AdaptationSet element are reproduced (accumulated). Note that, although the case in which "For adults" is selected as the answer to the question has been exemplified here, when "For children" is selected, the PDI-As do not match, and thus the streams of content (components) enumerated under the corresponding AdaptationSet element are not reproduced (accumulated).

(Second Designation Method)

In addition, as a second designation method of the provider-side PDI-A, "urn:ATSC:PDIReference" may be defined as the schemeIdUri attribute of the EssentialProperty element, and a reference URL to the PDI instance may be stored in the value attribute. When this method is employed, for example, "http://a.com/thePdi.pdi" is stored as the value attribute of the EssentialProperty element, and thus, by acquiring a PDI file according to this reference source URL, the PDI instance described there (provider-side PDI-A) is obtained. Then, target streams are reproduced (accumulated) only when the substance of the PDI instance (provider-side PDI-A) obtained from the PDI file matches the substance of the PDI instance (client-side PDI-A) generated (saved) at the client device side.

(Example of Description of MPD)

FIG. 17 is a diagram showing an example of a description of an MPD.

In FIG. 17, two AdaptationSet elements are exemplified as lower-level elements of a Period element. The AdaptationSet element with id=1 is of a described substance corresponding to the above-described first designation method, and the AdaptationSet element with id=2 is of a described substance corresponding to the above-described second designation method.

An EssentialProperty element subordinate to the AdaptationSet element with id=1 has "urn:ATSC:PDIInstance" designated as a value of a schemeIdUri attribute, a start tag and an end tag of a PDITable element and QSA element are disposed as values of a value attribute, and a following id element, q element, and a element are disposed as lower-level elements. "ProviderA:123" is designated between the start tag and end tag of the id element, "Which do you prefer, captions for adult or for children?" is designated between the start tag and the end tag of the q element, and "For adults" is designated between the start tag and the end tag of the a element. Note that a PDITable element may be omitted and only a QSA element may be disposed here.

Accordingly, the client device that can reproduce streams of content (components) enumerated under the AdaptationSet element with id=1 performs a matching process on the substance of a PDI instance (provider-side PDI-A) stored as a value attribute of the EssentialProperty element of the AdaptationSet element and the substance of a PDI instance (client-side PDI-A) generated (saved) at the client device side. Then, the client device reproduces the streams of the content enumerated under the AdaptationSet element only when the PDI instances match.

In the EssentialProperty element under the AdaptationSet element with id=2, "urn:ATSC:PDIReference" is designated as a value of a schemeIdUri attribute, and "http://a.com/thePdi.pdi" is designated as a value of a value attribute.

Accordingly, the client device that can reproduce streams of content (components) enumerated under the AdaptationSet element with id=2 performs a matching process on the substance of a PDI instance (provider-side PDI-A) obtained from a PDI file acquired according to the reference URL ("http://a.com/thePdi.pdi") stored as the value attribute of the EssentialProperty element of the AdaptationSet element and the substance of a PDI instance (client-side PDI-A) generated (saved) at the client device side. Then, the client device reproduces the streams of the content enumerated under the AdaptationSet element only when these PDI instances match.

Since the PDI can be disposed in the MPD by designating information with regard to the PDI instance (provider-side PDI-A) using the schemeIdUri attribute and the value attribute of the EssentialProperty element in the AdaptationSet element as described above, the PDI can be provided from the provider server to the client device, and content can be provided according to preference of the user.

Note that, although the case in which the EssentialProperty element is described in the AdaptationSet element is shown in the example of the description of the MPD in FIG. 17, the EssentialProperty element may be described in the Representation element (of FIG. 15) or the SubRepresentation element (of FIG. 15). In addition, using the SupplementalProperty element in place of the EssentialProperty element, the information with regard to the PDI instance (provider-side PDI-A) can also be designated in the AdaptationSet element or the like.

(2) System Configuration (Example of Configuration of a Broadcast Communication System)

FIG. 18 is a diagram showing an example of a configuration of a broadcast communication system according to the first embodiment. Note that a system means a set of a plurality of constituent elements (devices or the like).

The broadcast communication system 1 of FIG. 18 is a system which performs a matching process on the client-side PDI-A with reference to the provider-side PDI-A included in the above-described MPD, and thus can provide content according to preferences of a user.

In FIG. 18, the broadcast communication system 1 is constituted by a provider server 10, a broadcast server 20, a communication server 30, and a client device 50. The client device 50 is connected to the communication server 30 via a network 90 configured to be the Internet or the like. In addition, the provider server 10 is connected to the broadcast server 20 and the communication server 30 to communicate between them.

The provider server 10 accumulates stream data of content and metadata of the content. The provider server 10 generates segment data based on the stream data of the content, and transmits the segment data to the broadcast server 20 or the communication server 30. Note that the content is composed of one or more components such as audio or videos, captions, and the like. The segment data is data obtained by dividing a file of each component into segments based on a standard of ISO Base Media File Format (BMFF) when a stream of the content is transmitted in a FLUTE session or the like. Segments include an initialize segment (Initialization Segment) and a media segment (Media Segment); however, for the sake of simplicity in description, these segments will be described without particular distinguishment.

In addition, the provider server 10 generates a Preference Demographic and Interest-Question (PDI-Q) that is information indicating questions on preferences of a user who is using the client device 50, and transmits it to the broadcast server 20 or the communication server 30.

Further, the provider server 10 generates a Preference Demographic and Interest-Answer (PDI-A) (a provider-side PDI-A) that is information indicating answers set by the provider to the questions on preferences of the user based on the PDI-Q. Then, the provider server 10 generates a Media Presentation Description (MPD) that includes the provider-side PDI-A based on the metadata of the content, and transmits it to the broadcast server 20 or the communication server 30.

The broadcast server 20 receives the segment data transmitted from the provider server 10 and the MPD including the provider-side PDI-A. The broadcast server 20 generates signaling information based on the MPD including the provider-side PDI-A from the provider server 10 and original data of the signaling information acquired from various servers and the like. The broadcast server 20 transmits the signaling information together with the segment data of the content on a digital broadcast signal.

The communication server 30 receives the segment data transmitted from the provider server 10 and a file of the MPD including the provider-side PDI-A. The communication server 30 generates signaling information based on the file of the MPD including the provider-side PDI-A from the provider server 10 and the original data of the signaling information acquired from the various servers and the like. The communication server 30 transmits the segment data of the content or the signaling information to the client device 50 via the network 90 according to a request from the client device 50.

Note that the broadcast server 20 or the communication server 30 receives the PDI-Q transmitted from the provider server 10, and transmits it to the client device 50 at a predetermined timing. However, the PDI-Q may be transmitted to the client device 50 directly from the provider server 10.

The client device 50 receives the PDI-Q transmitted from the broadcast server 20 or the communication server 30. The client device 50 generates and saves a PDI-A (a client-side PDI-A) that is information indicating an answer of the user to the question of the received PDI-Q based on the PDI-Q.

The client device 50 receives the segment data and the signaling information transmitted on the digital broadcast signal from the broadcast server 20. In addition, the client device 50 receives the segment data and the signaling information transmitted from the communication server 30 via the network 90 according to a request made to the communication server 30.

Here, upon receiving the segment data of the content transmitted in broadcasting or communication, the client device 50 performs a matching process on the provider-side PDI-A included in the MPD as the signaling information and the client-side PDI-A that the device is saving. Then, the client device 50 acquires the segment data of the content transmitted in broadcasting or communication based on the signaling information transmitted in broadcasting or communication according to the result of the matching process, and reproduces content for which the PDI-As match.

The broadcast communication system 1 is configured as described above. Next, detailed configurations of respective devices constituting the broadcast communication system 1 of FIG. 18 will be described.

(Example of Configurations of Devices on Transmission Side)

Figure 19:
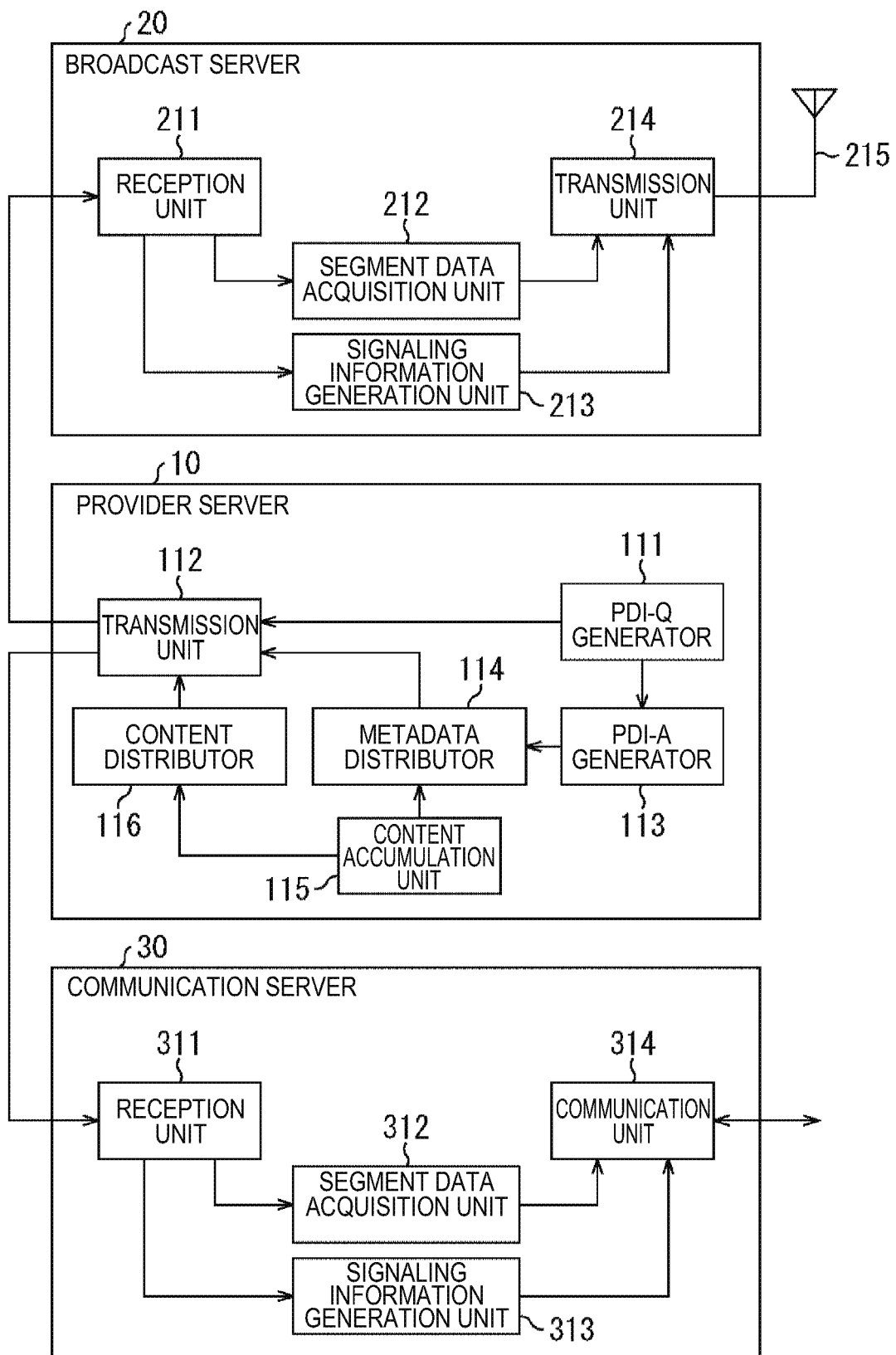
FIG. 19 is a diagram showing an example of configurations of servers.

FIG. 19 is a diagram showing an example of configurations of the servers of FIG. 18.

In FIG. 19, the provider server 10 is constituted by a PDI-Q generator 111, a transmission unit 112, a PDI-A generator 113, a metadata distributor 114, a content accumulation unit 115, and a content distributor 116.

The PDI-Q generator 111 generates a PDI-Q, and supplies it to the transmission unit 112 or the PDI-A generator 113. The transmission unit 112 transmits the PDI-Q supplied from the PDI-Q generator 111 to the broadcast server 20 or the communication server 30. The PDI-A generator 113 generates a provider-side PDI-A based on the PDI-Q supplied from the PDI-Q generator 111, and supplies it to the metadata distributor 114.

The metadata distributor 114 specifies (collates) content corresponding to an answer set by the provider side from content accumulated in the content accumulation unit 115 based on the provider-side PDI-A supplied from the PDI-A generator 113. The metadata distributor 114 generates an MPD that includes the provider-side PDI-A based on metadata of the specified content, and supplies it to the transmission unit 112. The transmission unit 112 transmits the MPD including the provider-side PDI-A supplied from the metadata distributor 114 to the broadcast server 20 or the communication server 30.

The content distributor 116 acquires stream data (a file) of the content specified by the metadata distributor 114 from the content accumulated in the content accumulation unit 115. The content distributor 116 generates segment data based on the acquired stream data of the content, and supplies it to the transmission unit 112. The transmission unit 112 transmits the segment data of the content supplied from the content distributor 116 to the broadcast server 20 or the communication server 30.

The provider server 10 is configured as described above.

In FIG. 19, the broadcast server 20 is constituted by a reception unit 211, a segment data acquisition unit 212, a signaling information generation unit 213, and a transmission unit 214.

The reception unit 211 receives the segment data and the MPD including the provider-side PDI-A transmitted from the provider server 10, and supplies the segment data to the segment data acquisition unit 212 and the MPD including the provider-side PDI-A to the signaling information generation unit 213.

The segment data acquisition unit 212 acquires and processes the segment data supplied from the reception unit 211, and then supplies it to the transmission unit 214. The signaling information generation unit 213 generates signaling information based on the MPD including the provider-side PDI-A supplied from the reception unit 211 and the original data of the signaling information acquired from various servers and the like, and supplies it to the transmission unit 214.

The transmission unit 214 receives supply of the segment data from the segment data acquisition unit 212 and the signaling information from the signaling information generation unit 213. The transmission unit 214 modulates the segment data and the signaling information of the content, and transmits them on a digital broadcast signal via an antenna 215.

Note that, when the PDI-Q has been received from the provider server 10, the broadcast server 20 transmits the PDI-Q on a digital broadcast signal. Here, although the PDI-Q can be transmitted to be included in signaling information, for example, an MPD or the like, it may be acquired by the client device 50 prior to reproduction of content, and a transmission form and a transmission timing thereof are arbitrary.

In addition, the segment data of the content and a file of Service Channel Signaling (SCS) are transmitted using a File Delivery over Unidirectional Transport (FLUTE) session on broadcast waves of digital broadcasting using the IP transmission scheme.

The broadcast server 20 is configured as described above.

In FIG. 19, the communication server 30 is constituted by a reception unit 311, a segment data acquisition unit 312, a signaling information generation unit 313, and a communication unit 314.

The reception unit 311 receives the segment data of the content and the MPD including the provider-side PDI-A transmitted from the provider server 10, and supplies the segment data to the segment data acquisition unit 312 and the MPD including the provider-side PDI-A to the signaling information generation unit 313.

The segment data acquisition unit 312 acquires and processes the segment data supplied from the reception unit 311, and supplies it to the communication unit 314. The signaling information generation unit 313 generates signaling information based on the MPD including the provider-side PDI-A supplied from the reception unit 311 and the original data of the signaling information acquired from the various servers and the like, and supplies it to the communication unit 314.

The communication unit 314 receives the supply of the segment data from the segment data acquisition unit 312 and the signaling information from the signaling information generation unit 313. The communication unit 314 transmits the segment data of the content or the signaling information to the client device 50 via the network 90 according to a request for segment data or signaling information coming from the client device 50.

Note that, when the PDI-Q has been received from the provider server 10, the communication server 30 transmits the PDI-Q to the client device 50 via the network 90 according to a request for a PDI-Q coming from the client device 50. Here, although the PDI-Q can be transmitted to be included in signaling information, for example, an MPD or the like, it may be acquired by the client device 50 prior to reproduction of content, and a transmission form and a transmission timing thereof are arbitrary.

The communication server 30 is configured as described above.

Note that, although the provider server 10, the broadcast server 20, and the communication server 30 on the transmission side have been described as individual devices in FIGS. 18 and 19 for the sake of convenience in description, the devices on the transmission side are acceptable as long as they have the functional configurations shown in FIG. 19, and, for example, the provider server 10 and the broadcast server 20, or the provider server 10 and the communication server 30 may be understood as one device. At this time, with regard to the overlapping function of, for example, the reception units, the transmission units, or the like, they can be integrated into one.

In addition, by separating the function of providing segment data and the function of providing signaling information of the communication server 30, for example, segment data and signaling information may be provided from different servers. Furthermore, the broadcast server 20 or the communication server 30 may be set to generate segment data or an MPD that includes a provider-side PDI-A.

(Example of Configuration of Device on Reception Side)

Figure 20:
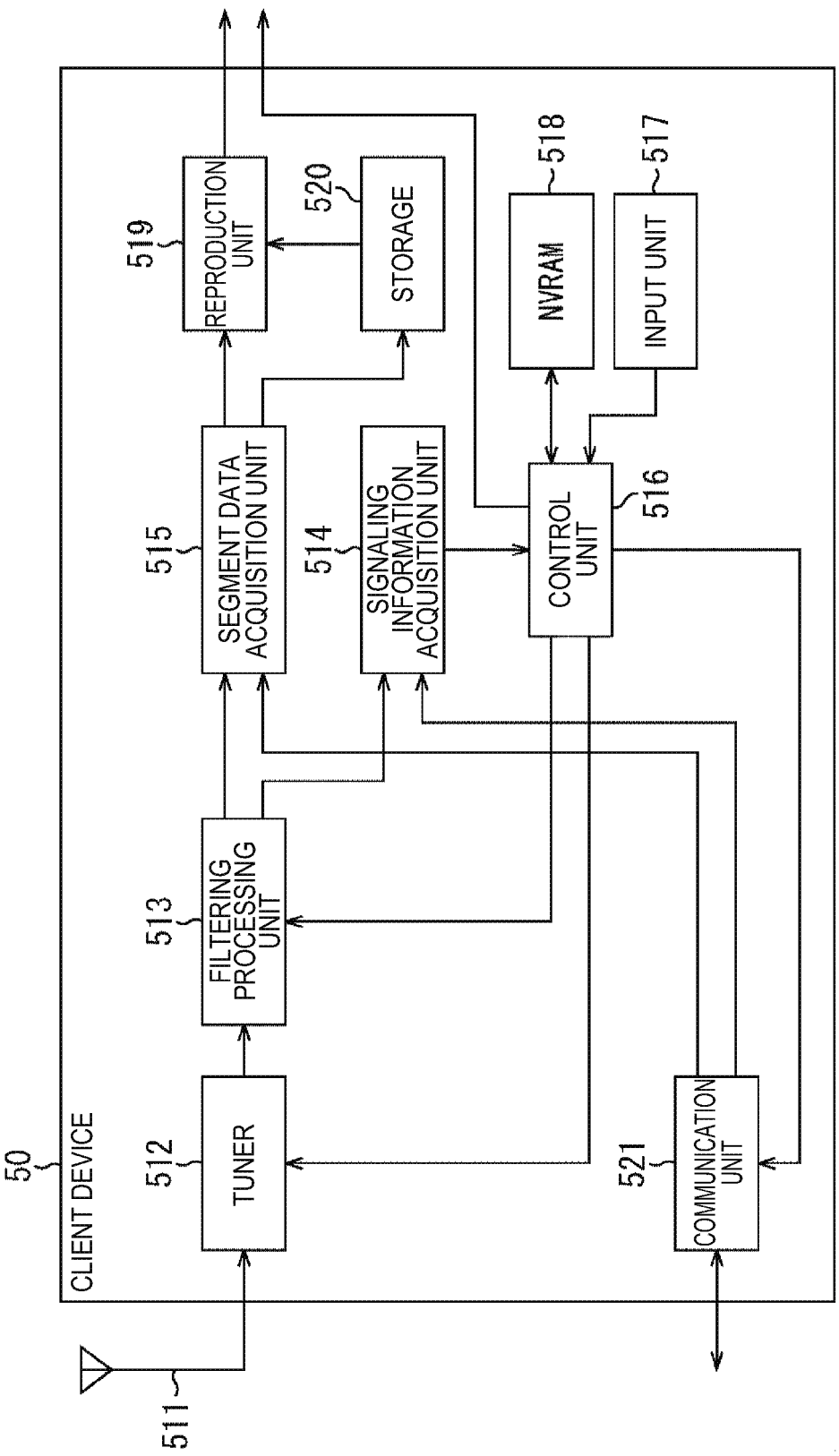
FIG. 20 is a diagram showing an example of a configuration of a client device.

FIG. 20 is a diagram showing an example of a configuration of the client device of FIG. 18.

In FIG. 20, the client device 50 is constituted by a tuner 512, a filtering processing unit 513, a signaling information acquisition unit 514, a segment data acquisition unit 515, a control unit 516, an input unit 517, an NVRAM 518, a reproduction unit 519, a storage 520, and a communication unit 521.

The tuner 512 extracts and demodulates a digital broadcast signal of a specific service for which tuning has been instructed from broadcast waves of digital broadcasting received via an antenna 511 using the IP transmission scheme according to control of the control unit 516, and supplies a BBP stream obtained as a result of the process to the filtering processing unit 513.

The filtering processing unit 513 performs a filtering process on packets transmitted in the BBP stream supplied from the tuner 512 using an IP address, a port number, a TSI, a TOI, and the like according to control from the control unit 516. Through this filtering process, signaling information such as LLS or SCS, or segment data of content is extracted. Then, the signaling information is supplied to the signaling information acquisition unit 514, and the segment data is supplied to the segment data acquisition unit 515.

The signaling information acquisition unit 514 acquires and processes the signaling information obtained as a result of the filtering process by the filtering processing unit 513 or the signaling information supplied from the communication unit 521, and supplies it to the control unit 516. Note that, when SCS acquired as the signaling information is transmitted in a FLUTE session, data stored in LCT packets is analyzed, and thereby a file of a USD or an MPD is acquired.

The control unit 516 controls operations of the respective units of the client device 50 based on an operation signal from the input unit 517, and the like. When LLS is supplied from the signaling information acquisition unit 514 as signaling information during an initial scanning process, the control unit 516 causes an SCD to be saved in the NVRAM 518 as tuning information. Then, when the user performs a tuning operation for a service, the control unit 516 reads the tuning information from the NVRAM 518, and controls a tuning process executed by tuner 512 based on the tuning information.

In addition, upon receiving the supply of the PDI-Q from the signaling information acquisition unit 514 as signaling information, the control unit 516 generates a client-side PDI-A based on the PDI-Q, and saves it in the NVRAM 518. Then, upon receiving the supply of the SCS from the signaling information acquisition unit 514 as signaling information, the control unit 516 performs a matching process on the provider-side PDI-A included in the MPD and the client-side PDI-A saved in the NVRAM 518.

When the PDI-As match as a result of the matching process of the PDI-As, the control unit 516 controls a filtering process executed by the filtering processing unit 513 based on the IP address, the port number, the TSI, the TOI, and the like obtained from the SCS supplied from the signaling information acquisition unit 514 as signaling information. Segment data of the content is supplied to the segment data acquisition unit 515 through this filtering process.

The segment data acquisition unit 515 acquires and processes the segment data of the content obtained as a result of the filtering process by the filtering processing unit 513 or the segment data of the content supplied from the communication unit 521, and supplies the data to the reproduction unit 519 or the storage 520. Note that when the segment data of the content is transmitted in the FLUTE session, segment data stored in the LCT packets is extracted by accessing the audio or video stream.

The reproduction unit 519 reproduces audio data obtained from the segment data of the content acquired by the segment data acquisition unit 515 according to control of the control unit 516, and outputs the data to a speaker (not shown). The speaker outputs a sound corresponding to the audio data output from the reproduction unit 519.

In addition, the reproduction unit 519 reproduces video data obtained from the segment data of the content acquired by the segment data acquisition unit 515 according to control of the control unit 516, and outputs the data to a display (not shown). The display displays a video corresponding to the video data output from the reproduction unit 519.

The storage 520 accumulates the audio data and the video data of the content obtained from the segment data supplied from the segment data acquisition unit 515. The storage 520 supplies the accumulated audio data and video data of the content according to a request from the reproduction unit 519. The reproduction unit 519 reproduces the audio data and the video data read from the storage 520.

The communication unit 521 accesses the communication server 30 via the network 90 to request signaling information according to control of the control unit 516. The communication unit 521 receives the signaling information transmitted from the communication server 30 via the network 90 and supplies the information to the signaling information acquisition unit 514.

Furthermore, the communication unit 521 accesses the communication server 30 via the network 90 to request distribution of streams according to control of the control unit 516. The communication unit 521 receives segment data of the streams of the content streaming-distributed from the communication server 30 via the network 90 and supplies the data to the segment data acquisition unit 515.

Note that the tuner 512, the input unit 517, the NVRAM 518, the storage 520, and the communication unit 521 are configured as, for example, hardware in the client device 50 of FIG. 20. In addition, partial functions of the filtering processing unit 513, the signaling information acquisition unit 514, the segment data acquisition unit 515, and the control unit 516, and a partial function of the reproduction unit 519 are functions realized with, for example, software ("middleware" or "DASH client") in the client device 50.

In addition, although the speaker and the display are configured to be provided outside the client device 50 in the example of the configuration thereof in FIG. 20, the client device 50 may be configured to have a speaker and a display. In this case, the client device 50 is configured as a television receiver set, and installed in a house of the user, or the like.

(Example of Functional Configuration of Control Unit)

Figure 21:
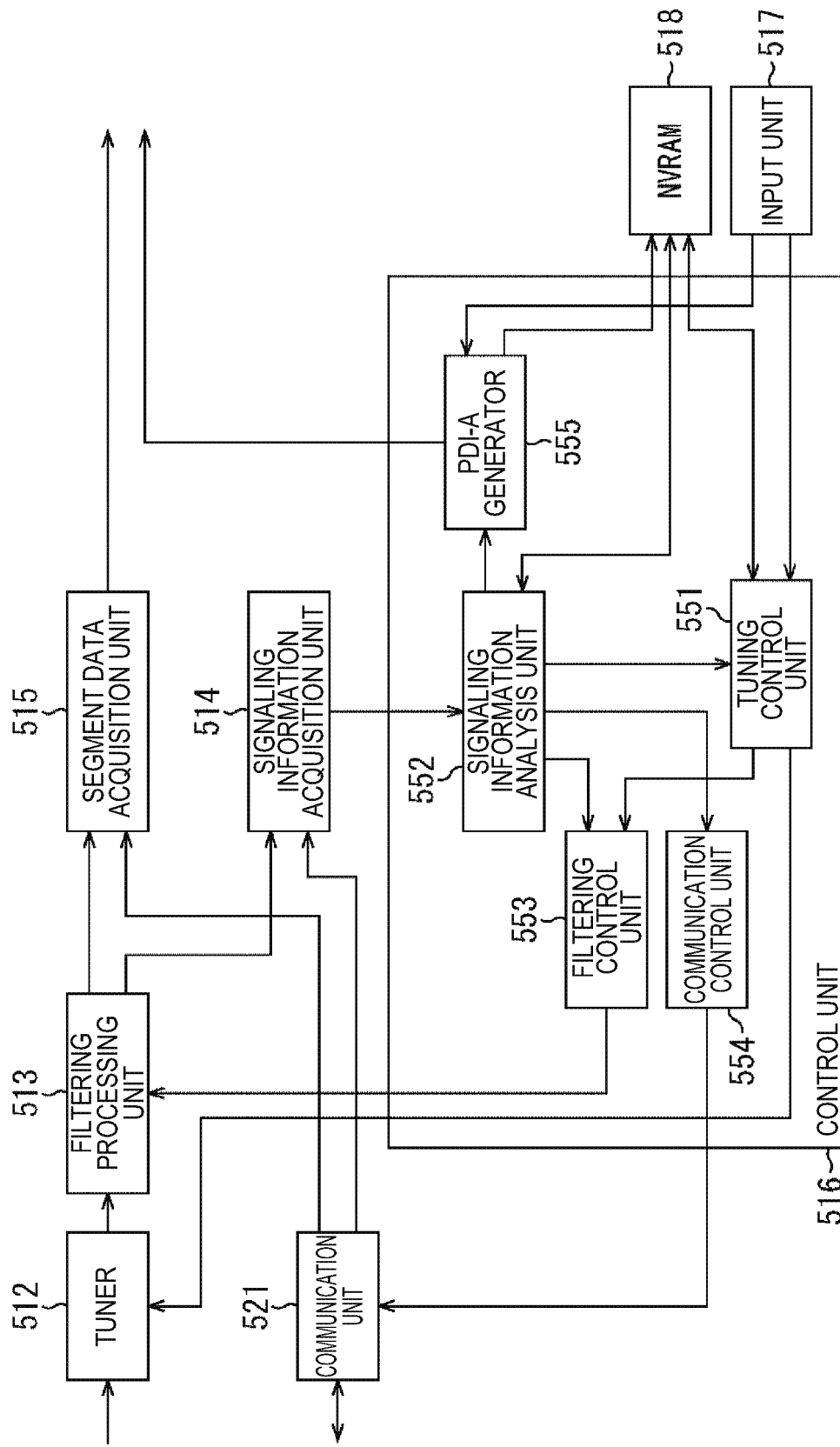
FIG. 21 is a diagram showing an example of a functional configuration of a control unit of the client device.

FIG. 21 is a diagram showing an example of a functional configuration of the part of the control unit 516 of FIG. 20 which controls the initial scanning process, the tuning process, the filtering process, the communication process, and the PDI-A matching process.

In FIG. 21, the control unit 516 is constituted by a tuning control unit 551, a signaling information analysis unit 552, a filtering control unit 553, a communication control unit 554, and a PDI-A generator 555.

The tuning control unit 551 controls the tuning process executed by the tuner 512. The filtering control unit 553 controls the filtering process executed by the filtering processing unit 513.

As the tuning control unit 551 controls the tuner 512 and the filtering control unit 553 controls the filtering processing unit 513 during the initial scanning process, the signaling information acquisition unit 514 acquires an SCD transmitted as LLS, and supplies it to the signaling information analysis unit 552. The signaling information analysis unit 552 causes tuning information obtained by analyzing the SCD from the signaling information acquisition unit 514 to be saved in the NVRAM 518.

The tuning control unit 551 acquires the tuning information saved in the NVRAM 518 at the time of the tuning process. The tuning control unit 551 controls the tuning process executed by the tuner 512 based on the acquired tuning information. In addition, the tuning control unit 551 supplies SCS Bootstrap information of the SCD included in the tuning information to the filtering control unit 553.

The filtering control unit 553 controls the filtering process executed by the filtering processing unit 513 based on the SCS Bootstrap information supplied from the tuning control unit 551. Accordingly, the filtering processing unit 513 executes the filtering process on the LCT packets of the SCS, and thus the signaling information acquisition unit 514 acquires the signaling information (SCS) such as a USD or an MPD. The signaling information acquisition unit 514 supplies the signaling information (SCS) to the signaling information analysis unit 552.

The signaling information analysis unit 552 analyzes the signaling information (SCS) supplied from the signaling information acquisition unit 514, and supplies the result of the analysis to the filtering control unit 553 or the communication control unit 554. In addition, when the signaling information (for example, an MPD) includes a PDI-Q, the signaling information analysis unit 552 supplies the PDI-Q to the PDI-A generator 555.

The PDI-A generator 555 generates a client-side PDI-A based on the PDI-Q supplied from the signaling information analysis unit 552 and causes it to be saved in the NVRAM 518. For example, the PDI-A generator 555 causes the question described in the PDI-Q and options for an answer to be displayed on the display (for example, the interactive screen of FIG. 9), and generates the client-side PDI-A according to the result of selection of an option for the answer of the user from the input unit 517 to the question.

The signaling information analysis unit 552 performs a matching process on the provider-side PDI-A included in the MPD and the client-side PDI-A saved in the NVRAM 518 based on the result of the analysis of the signaling information, and when the PDI-As match, the signaling information analysis unit specifies a distribution path of streams of target content. In addition, when the PDI-As do not match as a result of the matching process on the PDI-As, the signaling information analysis unit 552 stops reproduction (accumulation) of the target content.

Then, when the distribution path of segment data of the target content is for broadcasting, the signaling information analysis unit 552 specifies an IP address, a port number, a TSI, and a TOI for accessing the streams thereof, and supplies them to the filtering control unit 553. In addition, when the distribution path of the segment data is for communication, the signaling information analysis unit 552 supplies information of an acquisition source thereof (for example, a URL) to the communication control unit 554.

The filtering control unit 553 controls the filtering process executed by the filtering processing unit 513 based on the IP address, the port number, the TSI, and the TOI supplied from the signaling information analysis unit 552. Accordingly, the filtering processing unit 513 executes the filtering process on the LCT packets of the segment data, and supplies the segment data of the content obtained therefrom to the segment data acquisition unit 515.

The communication control unit 554 controls a communication process executed by the communication unit 521 based on information of the acquisition source (for example, a URL) supplied from the signaling information analysis unit 552. Accordingly, the communication unit 521 receives segment data of the content streaming-distributed from the communication server 30 via the network 90, and supplies the data to the segment data acquisition unit 515.

(3) Specific Flow of Processes of Devices

Next, a specific flow of processes of the respective devices constituting the broadcast communication system 1 of FIG. 18 will be described.

(Pre-Processing of Content Reproduction)

First, a flow of pre-processing of content reproduction executed by the client device 50 will be described with reference to the flowchart of FIG. 22. However, processes executed by the provider server 10 and the broadcast server 20 will also be shown in FIG. 22 for the sake of facilitating understanding of the description.

Figure 22:
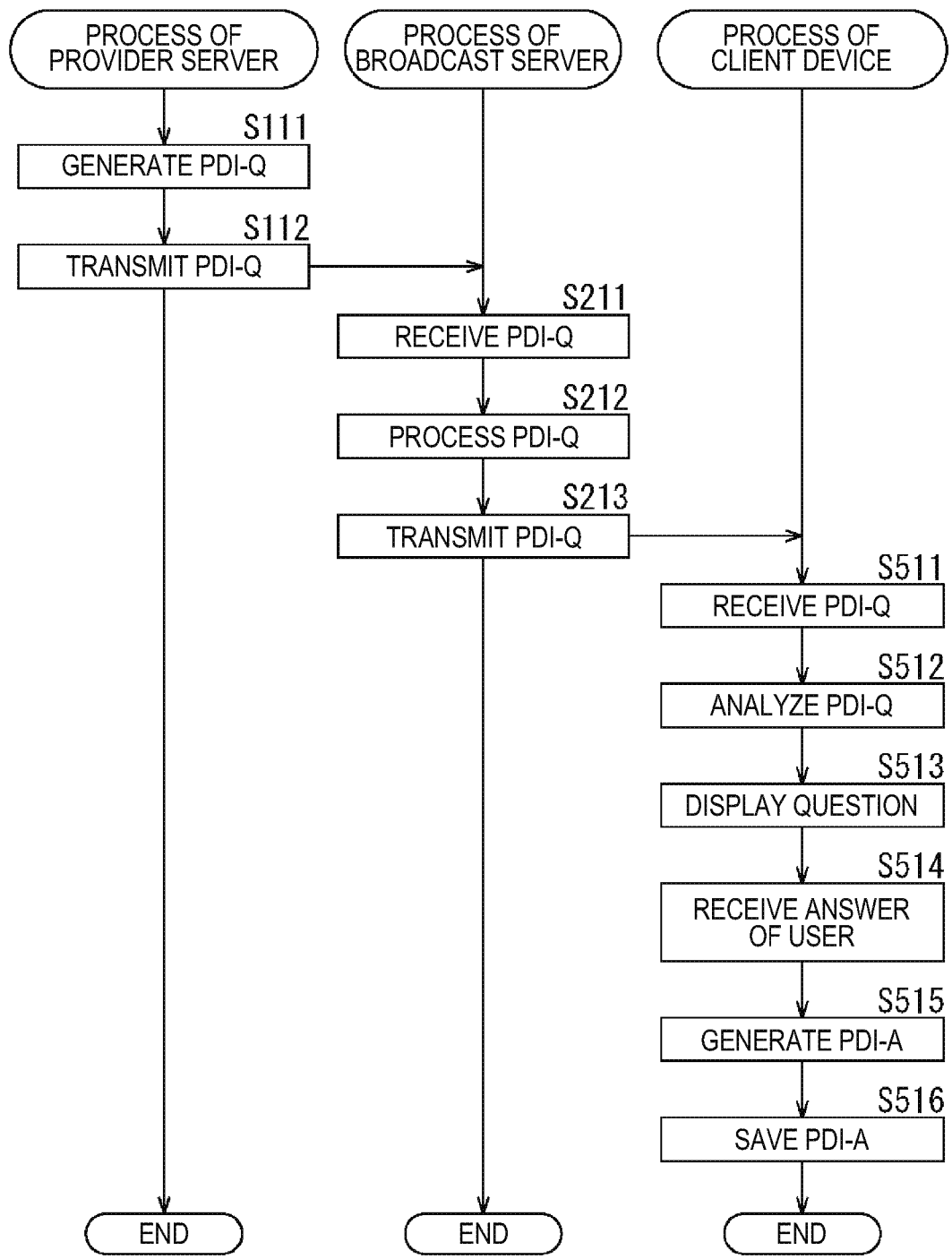
FIG. 22 is a flowchart describing pre-processing of content reproduction.

The provider server 10 executes processes of Steps S111 and S112 of FIG. 22. Specifically, in Step S111, the PDI-Q generator 111 generates a PDI-Q, and supplies it to the transmission unit 112. In Step S112, the transmission unit 112 transmits the PDI-Q supplied from the PDI-Q generator 111 to the broadcast server 20.

That is, when a sponsor or the broadcast provider of content to be broadcast (distributed) on the provider side such as a broadcast provider requests distribution of content to a user having a specific preference or attribute, a PDI-Q for asking the user who is using the client device 50 what preference or attribute does the user has is generated and transmitted to the broadcast server 20 according to operations of a staff of the provider side (a provider of the content).

The broadcast server 20 executes processes of Steps S211 to S213 of FIG. 22. Specifically, the reception unit 211 receives the PDI-Q transmitted from the provider server 10, and supplies it to the signaling information generation unit 213 in Step S211. In Step S212, the signaling information generation unit 213 processes the PDI-Q supplied from the reception unit 211 and supplies it to the transmission unit 214. In Step S213, the transmission unit 214 modulates the PDI-Q supplied from the signaling information generation unit 213, and transmits it on a digital broadcast signal via the antenna 215.

The client device 50 executes processes of Steps S511 to S516 of FIG. 22. Specifically, the PDI-Q is received in Step S511 as the tuner 512 performs the tuning process according to control of the tuning control unit 551, and the filtering processing unit 513 performs the filtering process according to the filtering control unit 553. The PDI-Q is acquired by the signaling information acquisition unit 514, and supplied to the signaling information analysis unit 552. When a PDI-Q is included in an MPD, the signaling information analysis unit 552 acquires the PDI-Q from the MPD, and supplies it to the PDI-A generator 555.

The PDI-A generator 555 analyzes the PDI-Q supplied from the signaling information analysis unit 552 in Step S512. In Step S513, the PDI-A generator 555 causes an answer to the question defined in the PDI-Q to be displayed on the display (for example, the interactive screen of FIG. 9) according to the result of the analysis of Step S512. Then, in Step S514, the PDI-A generator 555 receives an input or selection of an answer of the user to the question via the input unit 517.

In Step S515, the PDI-A generator 555 generates a PDI-A (a client-side PDI-A) according to the result of the input or selection of the answer of the user to the question based on an operation signal supplied from the input unit 517. In Step S516, the PDI-A generator 555 causes the generated client-side PDI-A to be saved in the NVRAM 518.

The pre-processing of content reproduction has been described above. The client device 50 generates (saves) the client-side PDI-A by executing the pre-processing of content reproduction and thereby completes preparation for the content reproduction. Note that the PDI-Q is acquired prior to reproduction (accumulation) of the content by the client device 50 as described above, and the PDI-Q can be acquired, for example, at a predetermined time interval from the broadcast server 20 or during tuning of a specific service.

(Content Distribution/Reproduction Process)

Next, a flow of a content distribution/reproduction process executed by the devices constituting the broadcast communication system 1 of FIG. 18 will be described with reference to the flowcharts of FIGS. 23 and 24.

Figure 23:
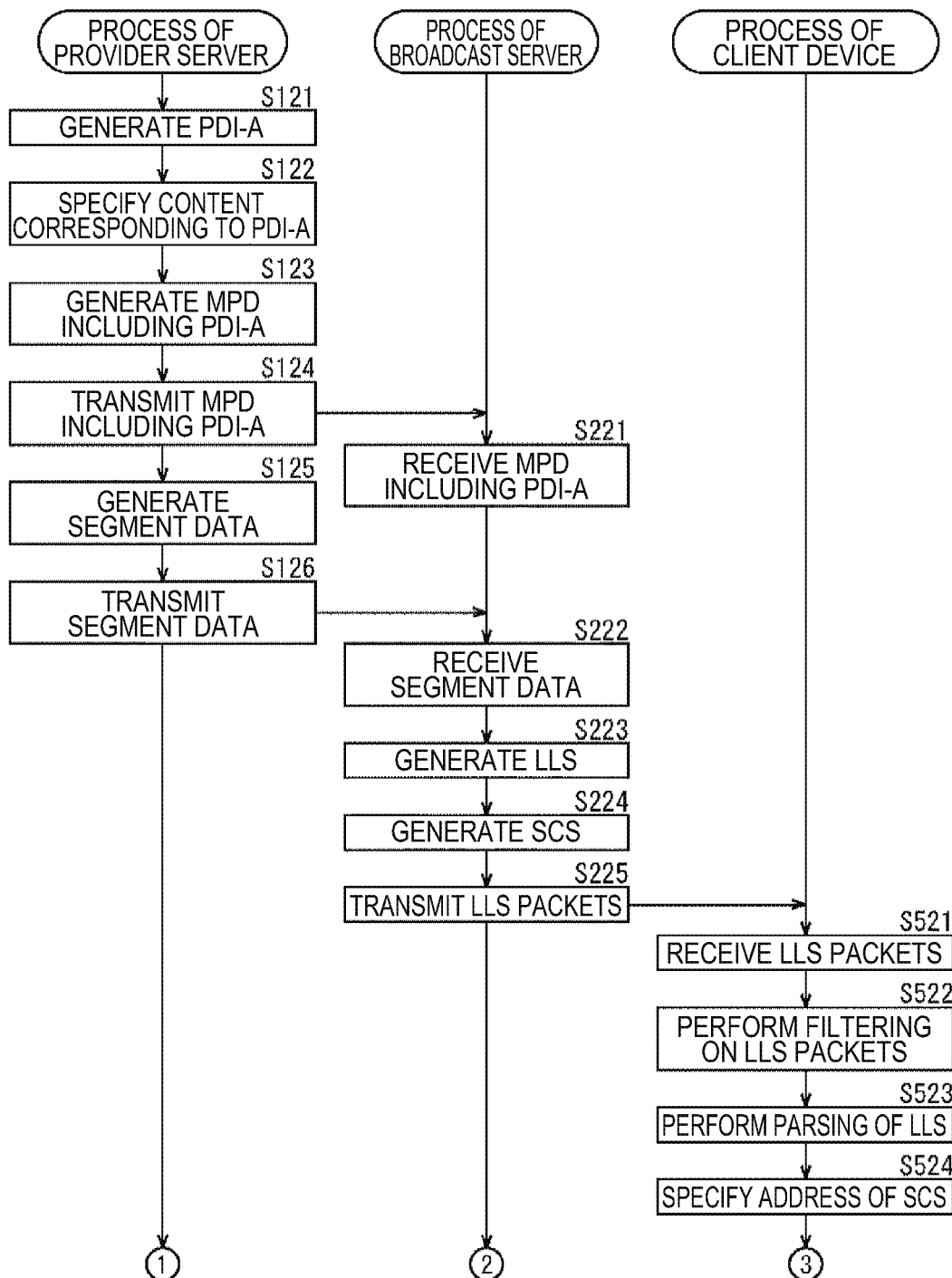
FIG. 23 is a flowchart describing a content distribution/reproduction process.

The provider server 10 executes the processes of Steps S121 to S126 of FIG. 23. Specifically, in Step S121, the PDI-A generator 113 generates a provider-side PDI-A based on the PDI-Q generated in Step S111 of FIG. 22, and supplies it to the metadata distributor 114.

That is, when the PDI-Q has been generated according to an operation of a staff of the provider such as a broadcast provider (a provider of the content), an answer to the question defined in the PDI-Q is caused to be displayed on the display (for example, the interactive screen of FIG. 9) to make the staff of the provider input or select the answer to the question, and thereby the PDI-A (provider-side PDI-A) indicating the answer is generated. After all, the provider-side PDI-A indicates information (an answer) for allowing the user who is using the client device 50 to view the content to be distributed to the user later in consideration of preference of the user by the provider side.

In Step S122, the metadata distributor 114 specifies (collates) content corresponding to the answer set by the provider side from the content accumulated in the content accumulation unit 115 based on the provider-side PDI-A supplied from the PDI-A generator 113.

Note that the content specified here may be one of which a similarity between the provider-side PDI-A and metadata of the accumulated content is higher than a predetermined value, and may be selected by a staff of the provider in advance as content to be viewed by the user.

In Step S123, the metadata distributor 114 generates an MPD including the provider-side PDI-A based on the metadata of the content specified in Step S122, and supplies it to the transmission unit 112. In Step S124, the transmission unit 112 transmits the MPD including the provider-side PDI-A supplied from the metadata distributor 114 to the broadcast server 20.

In Step S125, the content distributor 116 acquires stream data of audio or videos of the content specified by the metadata distributor 114 from the content accumulated in the content accumulation unit 115. The content distributor 116 generates segment data of the content based on the acquired stream data, and supplies the data to the transmission unit 112. In Step S126, the transmission unit 112 transmits the segment data of the content supplied from the content distributor 116 to the broadcast server 20.

Figure 24:
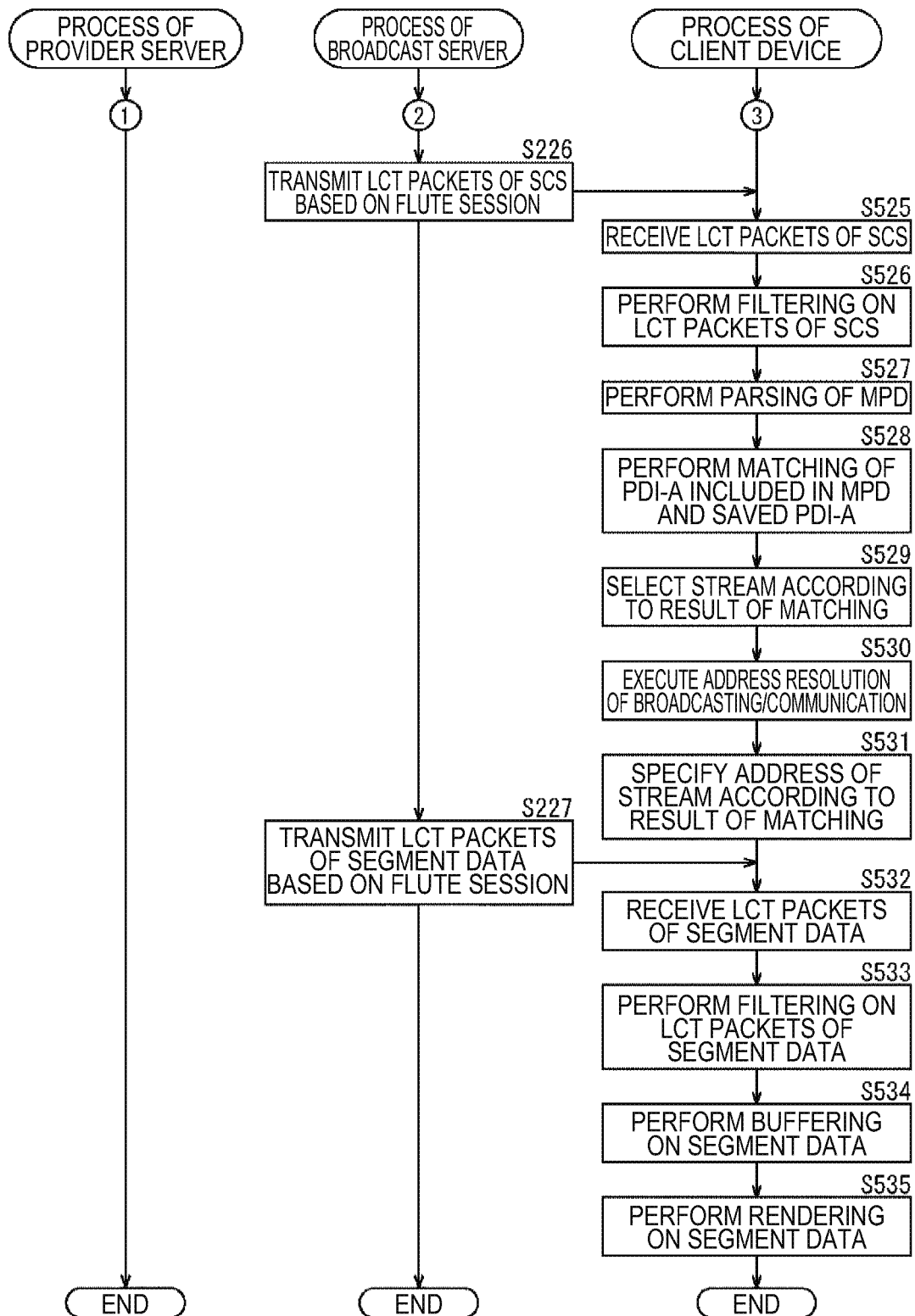
FIG. 24 is a flowchart describing the content distribution/reproduction process.

The broadcast server 20 executes processes of Steps S221 to S225 of FIG. 23 and processes of Steps S226 and S227 of FIG. 24. Specifically, in Step S221, the reception unit 211 receives the MPD including the provider-side PDI-A transmitted from the provider server 10. In addition, the reception unit 211 receives the segment data transmitted from the provider server 10 in Step S222.

In Step S223, the signaling information generation unit 213 generates signaling information of LLS based on original data of signaling information acquired from the various servers and the like. In addition, in Step S224, the signaling information generation unit 213 generates signaling information of SCS based on the MPD including the provider-side PDI-A supplied from the reception unit 211 and the original data of the signaling information acquired from the various servers and the like.

In Step S225, the transmission unit 214 transmits LLS packets on a digital broadcast signal via the antenna 215. In addition, in Step S226, the transmission unit 214 transmits LCT packets of SCS based on a FLUTE session on a digital broadcast signal using the IP transmission scheme via the antenna 215. Furthermore, in Step S227, the transmission unit 214 transmits LCT packets of segment data based on the FLUTE session on a digital broadcast signal using the IP transmission scheme via the antenna 215. As described above, the broadcast server 20 transmits the signaling information and the segment data on the digital broadcast signals using the IP transmission scheme.

The client device 50 executes processes of Steps S521 to S524 of FIG. 23 and processes of Steps S525 to S535 of FIG. 24. Specifically, the client device 50 receives the LLS packets transmitted from the broadcast server 20 as the digital broadcast signal (S521). In Step S522, the filtering processing unit 513 performs the filtering process on the LLS packets according to control of the filtering control unit 553.

In Step S523, the signaling information acquisition unit 514 performs parsing on the LLS packets to acquire signaling information such as the SCD. In addition, in Step S524, the signaling information analysis unit 552 specifies an address of the SCS based on SCS Bootstrap information included in the SCD.

Here, the client device 50 receives the LCT packets of the SCS based on the FLUTE session transmitted as the digital broadcast signal from the broadcast server 20 (S525). In Step S526, the filtering processing unit 513 performs a filtering process on the LCT packets of the SCS according to control of the filtering control unit 553. Since the LCT packets of the SCS are extracted through this filtering process, the signaling information such as the USD and the MPD is acquired by performing parsing on the LCT packets.

In Step S527, the signaling information analysis unit 552 performs parsing on the MPD. In Step S528, the signaling information analysis unit 552 performs a matching process on the provider-side PDI-A included in the MPD and the client-side PDI-A saved in Step S516 of FIG. 22 according to the result of the parsing of Step S527.

In Step S529, the signaling information analysis unit 552 selects a stream of the content according to the result of the matching process of Step S528.

When, for example, the provider-side PDI-A obtained from the MPD is the PDI-A of FIG. 11 and the client-side PDI-A saved in the NVRAM 518 is the PDI-A of FIG. 10, these PDI-As match, and thus, the stream of the content enumerated under the AdaptationSet element (the Representation element) of the MPD, for example, is selected as a reproduction target (accumulation target). On the other hand, when the provider-side PDI-A obtained from the MPD is the PDI-A of FIG. 12 and the client-side PDI-A saved in the NVRAM 518 is the PDI-A of FIG. 10, these PDI-As do not match, and thus the stream of the content enumerated under the AdaptationSet element (the Representation element) of the MPD is not selected as a reproduction target (accumulation target).

In Step S530, the signaling information analysis unit 552 refers to the USD for the stream of the content selected in Step S529 according to the result of parsing of Step S527 to execute the address resolution of broadcasting/communication. Note that, since information for identifying a distribution path of the stream is designated in a deliveryMethod element of the USD, it is possible to execute the address resolution of the stream of the content enumerated in the AdaptationSet element (Representation element) of the MPD in broadcasting or communication in which the stream has been transmitted with reference to the USD. Here, description continues below on the assumption that the stream of the content enumerated in the AdaptationSet element (Representation element) of the MPD is transmitted in broadcasting.

In Step S531, the signaling information analysis unit 552 specifies an address (an IP address, a port number, a TSI, and a TOI) for acquiring the audio or video stream constituting the content according to the result of the matching process of Step S528 based on the signaling information such as a FDD or an SDP.

Here, the client device 50 receives the LCT packets of the segment data based on the FLUTE session transmitted as the digital broadcast signal from the broadcast server 20 (S532). In Step S533, the filtering processing unit 513 performs the filtering process on the LCT packets of the segment data according to control of the filtering control unit 553. Segment data is extracted from the LCT packets of the segment data through this filtering process, and then the segment data acquisition unit 515 acquires the data.

Then, the reproduction unit 519 performs buffering on the segment data supplied from the segment data acquisition unit 515 (S534), and further performs rendering (S535). Accordingly, the client device 50 reproduces content according to the result of the matching process on the PDI-As, i.e., content according to preference of the user. Note that the content according to the result of the matching process of the PDI-As may be accumulated in the storage 520 and then reproduced.

The content distribution/reproduction process has been described above. In this content distribution/reproduction process, the matching process of the provider-side PDI-A included in the MPD and the client-side PDI-A saved in advance is performed, and the content according to the result of the matching process on the PDI-As, i.e., the content according to preference of the user, can be reproduced. In addition, since PDI is employed, content to which metadata according to immediate needs is attached, other than metadata stipulated by the standard organization, can be reproduced.

Note that, although the example in which the PDI-Q, the content, and the like are distributed by the broadcast server 20 in multicast in the pre-processing of content reproduction of FIG. 22 and the content distribution/reproduction process of FIGS. 23 and 24 has been described for the sake of convenience in description, the PDI-Q, the content, and the like may be distributed in unicast by the communication server 30.

4. Second Embodiment

In a second embodiment, the provider server provides the client device with Preference Demographic and Interest (PDI) by disposing the PDI in an Electronic Service Guide (ESG), and thus content can be provided according to preference of a user. The ESG is an electronic service guide (program information), in which the substance of content including audio, videos, and the like and relevant control information can be described.

(1) Structure of ESG
(Structure of ESG)

Figure 25:
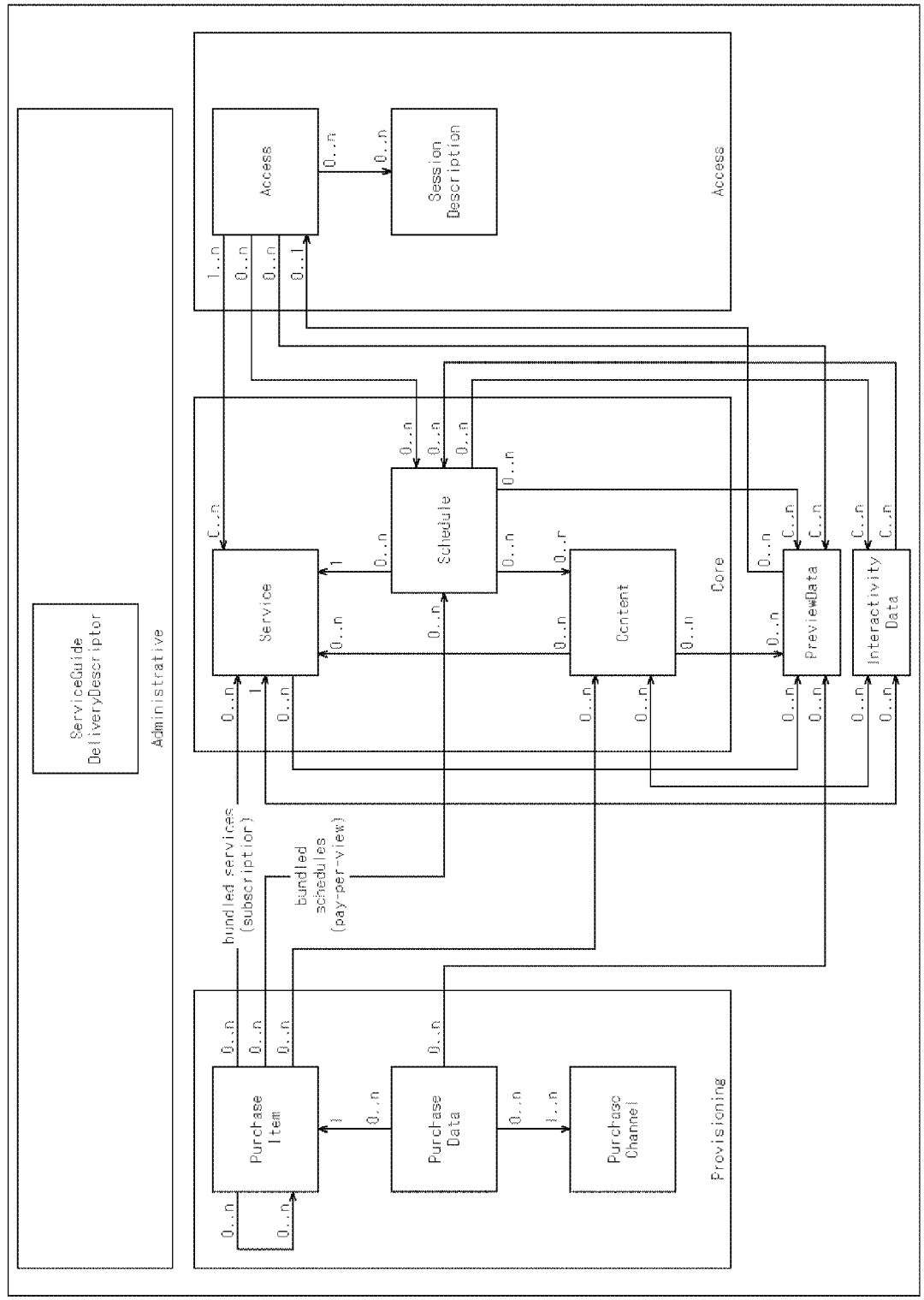
FIG. 25 is a diagram showing an example of a structure of an ESG

FIG. 25 is a diagram showing an example of a structure of the ESG Note that each line connecting fragments in FIG. 25 indicates cross reference between the connected fragments.

In FIG. 25, the ESG is constituted by the fragments each having their objectives, and the fragments are divided into 4 groups which are Administrative, Provisioning, Core, and Access.

The Administrative is a group that provides basic information with which an ESG can be received. The Administrative group includes ServiceGuideDeliveryDescriptor. The ServiceGuideDeliveryDescriptor provides information regarding a channel with which a plurality of service guide fragments can be received, scheduling information regarding the channel, and updating information to the client device. Accordingly, the client device can receive only a necessary ESG at a proper time.

The Provisioning is a group that provides fee information regarding service reception. The Provisioning group includes PurchaseItem, PurchaseData, and PurchaseChannel. The PurchaseItem provides fee information regarding a service or a service bundle. The PurchaseData provides information regarding how a user can pay fees. The PurchaseChannel provides information regarding a system in which a user actually can purchase a service.

The Core is a group that provides information regarding a service itself. The Core group includes Service, Schedule, and Content. The Service provides metadata including a channel, the substance of a service, and relevant control information. The Schedule provides metadata including a distribution schedule of content and relevant control information. The Content provides metadata including the substance of the content constituting the service and relevant control information.

Note that the provider-side PDI-A can be stored in at least one fragment of the Service fragment, the Schedule fragment, and the Content fragment.

The Access is a group that provides service access information indicating a method of receiving a service of the Core group and specific information regarding a session in which the content constituting the service is transmitted, and enables the client device to access the service. The Access group includes Access and SessionDescription.

The Access of the Access group provides the client device with a plurality of access methods for one service and thereby provides a method in which the device can access additional services based on the one service. The SessionDescription provides session information regarding a service transmitted in service access defined in the one Access fragment.

In addition, there are Preview Data and Interactivity Data on top of the 4 above-described groups. The PreviewData provides a preview, an icon, or the like for the service and the content. The InteractivityData provides metadata of an application with regard to the service and the content. Note that the PDI-Q can be stored in the Interactivity Data fragment.

Note that, as a specification of the Service Guide, Open Mobile Alliance (OMA) has stipulated the data configuration shown in FIG. 25. In addition, details of the configuration of the Service Guide shown in FIG. 25 are stipulated in OMA-TSBCAST_ServiceGuide-V1_0, Candidate Version 1.0 of "Service Guide for Mobile Broadcast Services" by the Open Mobile Alliance.

(Example of Configuration of Service Fragment)

FIG. 26 is a diagram showing an example of a configuration of the Service fragment of the ESG of FIG. 25.

A provider-side PDI-A is stored in the Service fragment of FIG. 26 by adding a new PDI-A element to a PrivateExt element stipulated in the lowest part. Specifically, the PDI-A element is encoded to be expressed in a character string of <xs:element name="PDI-A" type="xs:string" xmlns:xs="http://www.w3.org/2001/XMLSchema"/> in the XML schema.

(Example of Configuration of Schedule Fragment)

FIG. 27 is a diagram showing an example of a configuration of the Schedule fragment of the ESG of FIG. 25.

A provider-side PDI-A is stored in the Schedule fragment of FIG. 27 by adding a new PDI-A element to a PrivateExt element stipulated in the lowest part. Specifically, for example, the PDI-A element is encoded to be expressed in a character string of <xs:element name="PDI-A" type="xs:string" xmlns:xs="http://www.w3.org/2001/XMLSchema"/> in the XML schema.

(Example of Configuration of Content Fragment)

FIG. 28 is a diagram showing an example of a configuration of the Content fragment of the ESG of FIG. 25.

A provider-side PDI-A is stored in the Content fragment of FIG. 28 by adding a new PDI-A element to a PrivateExt element stipulated in the lowest part. Specifically, for example, the PDI-A element is encoded to be expressed in a character string of <xs:element name="PDI-A" type="xs:string" xmlns:xs="http://www.w3.org/2001/XMLSchema"/> in the XML schema.

Note that, although not shown, a PDI-Q is stored in the Interactivity Data fragment by adding a new PDI-Q element to a PrivateExt element.

(2) Configuration of System (Example of Configuration of a Broadcast Communication System)

Figure 29:
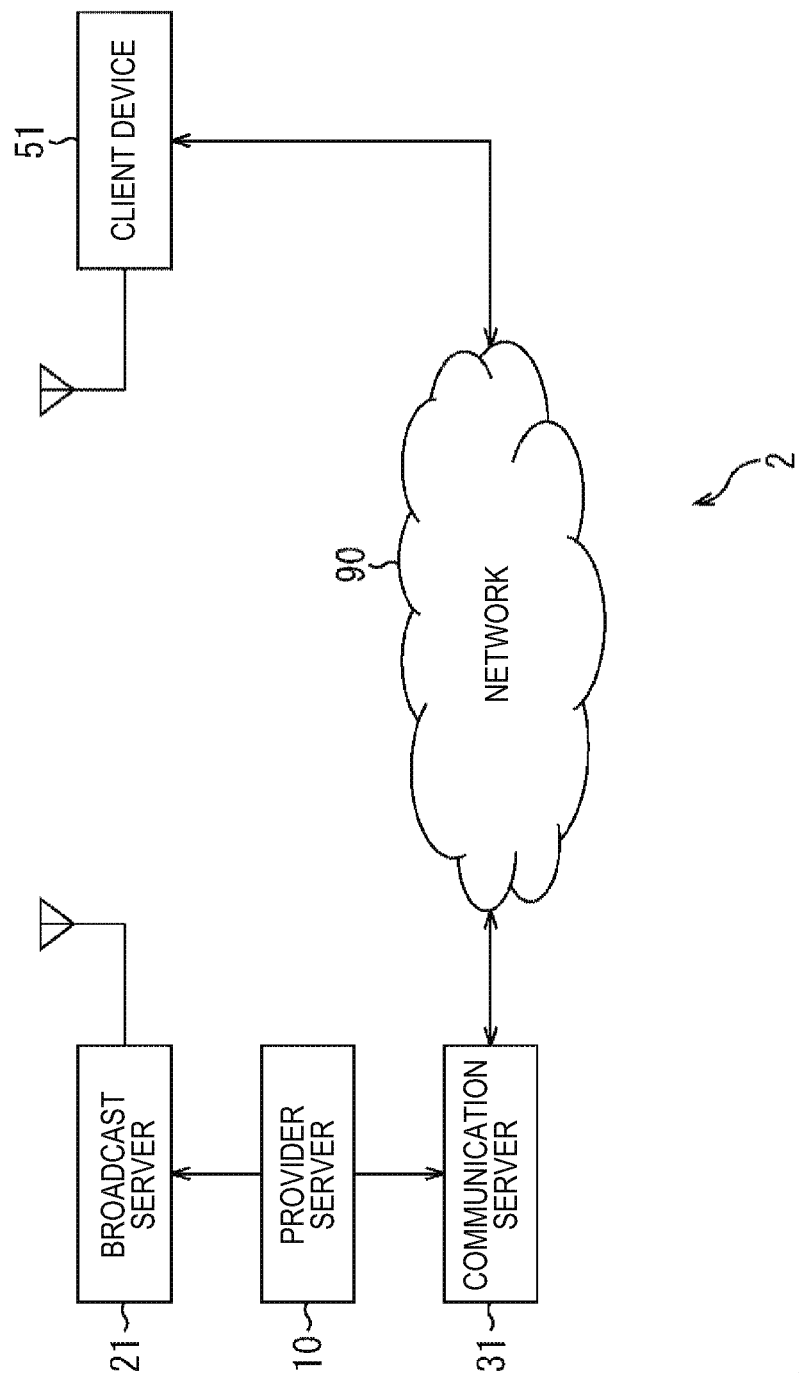
FIG. 29 is a diagram showing an example of a configuration of a broadcast communication system according to a second embodiment.

FIG. 29 is a diagram showing an example of a configuration of a broadcast communication system according to a second embodiment.

The broadcast communication system 2 of FIG. 29 is a system that can perform a matching process on a client-side PDI-A with reference to a provider-side PDI-A included in such an ESG described above, and thereby provide content according to preference of a user.

In FIG. 29, the broadcast communication system 2 is constituted by a provider server 10, a broadcast server 21, a communication server 31, and a client device 51. That is, the broadcast communication system 2 of FIG. 29 has differences in that the broadcast server 21 and the communication server 31 are provided instead of the broadcast server 20 and the communication server 30 and the client device 51 is provided instead of the client device 50 when it is compared to the broadcast communication system 1 of FIG. 18. In addition, the same reference numerals are given to parts of the broadcast communication system 2 of FIG. 29 similar to those of the broadcast communication system 1 of FIG. 18, and thus description thereof is appropriately omitted.

The provider server 10 generates segment data of content and an MPD, and transmits them to the broadcast server 21 or the communication server 31 along with metadata of the content. In addition, the provider server 10 generates a PDI-Q and a provider-side PDI-A, and transmits them to the broadcast server 21 or the communication server 31. That is, the MPD does not include the provider-side PDI-A in the second embodiment.

The broadcast server 21 receives the segment data, the MPD, the metadata of the content, the PDI-Q, and the provider-side PDI-A transmitted from the provider server 10. The broadcast server 21 generates signaling information based on the MPD from the provider server 10 and original data of signaling information acquired from various servers and the like.

In addition, the broadcast server 21 generates an ESG that includes at least one of the PDI-Q and the provider-side PDI-A based on the metadata of the content, the PDI-Q, the provider-side PDI-A from the provider server 10, and information for generating the ESG acquired from the various servers and the like. The broadcast server 21 transmits the signaling information and the ESG on a digital broadcast signal, along with the segment data.

The communication server 31 receives the segment data, the MPD, the metadata of the content, the PDI-Q, and the provider-side PDI-A transmitted from the provider server 10. The communication server 31 generates signaling information based on the MPD from the provider server 10 and the original data of the signaling information acquired from the various servers and the like.

In addition, the communication server 31 generates an ESG that includes at least one of the PDI-Q and the provider-side PDI-A based on the metadata of the content, the PDI-Q, and the provider-side PDI-A from the provider server 10 and information for generating the ESG acquired from the various servers and the like. The communication server 31 transmits the segment data, the signaling information, or the ESG to the client device 51 via a network 90 according to a request from the client device 51.

The client device 51 receives the ESG that includes at least one of the PDI-Q and the provider-side PDI-A transmitted from the broadcast server 21 or the communication server 31. The client device 51 generates and saves a PDI-A (a client-side PDI-A) that is information indicating an answer of a user to the question of the PDI-Q based on the PDI-Q obtained from the received ESG The client device 51 receives the segment data and the signaling information transmitted from the broadcast server 21 on the digital broadcast signal. In addition, the client device 51 receives the segment data and the signaling information transmitted from the communication server 31 via the network 90 according to a request with respect to the communication server 31.

Here, upon receiving the segment data of the content transmitted in broadcasting or communication, the client device 51 performs a matching process on the provider-side PDI-A included in the ESG and the saved client-side PDI-A. Then, the client device 51 acquires the segment data of the content transmitted in broadcasting or communication based on signaling information transmitted in broadcasting or communication according to the result of the matching process, and reproduces the content for which the PDI-As match.

The broadcast communication system 2 is configured as described above. Next, detailed configurations of the respective devices constituting the broadcast communication system 2 of FIG. 29 will be described.

(Example of Configurations of Devices on Transmission Side)

Figure 30:
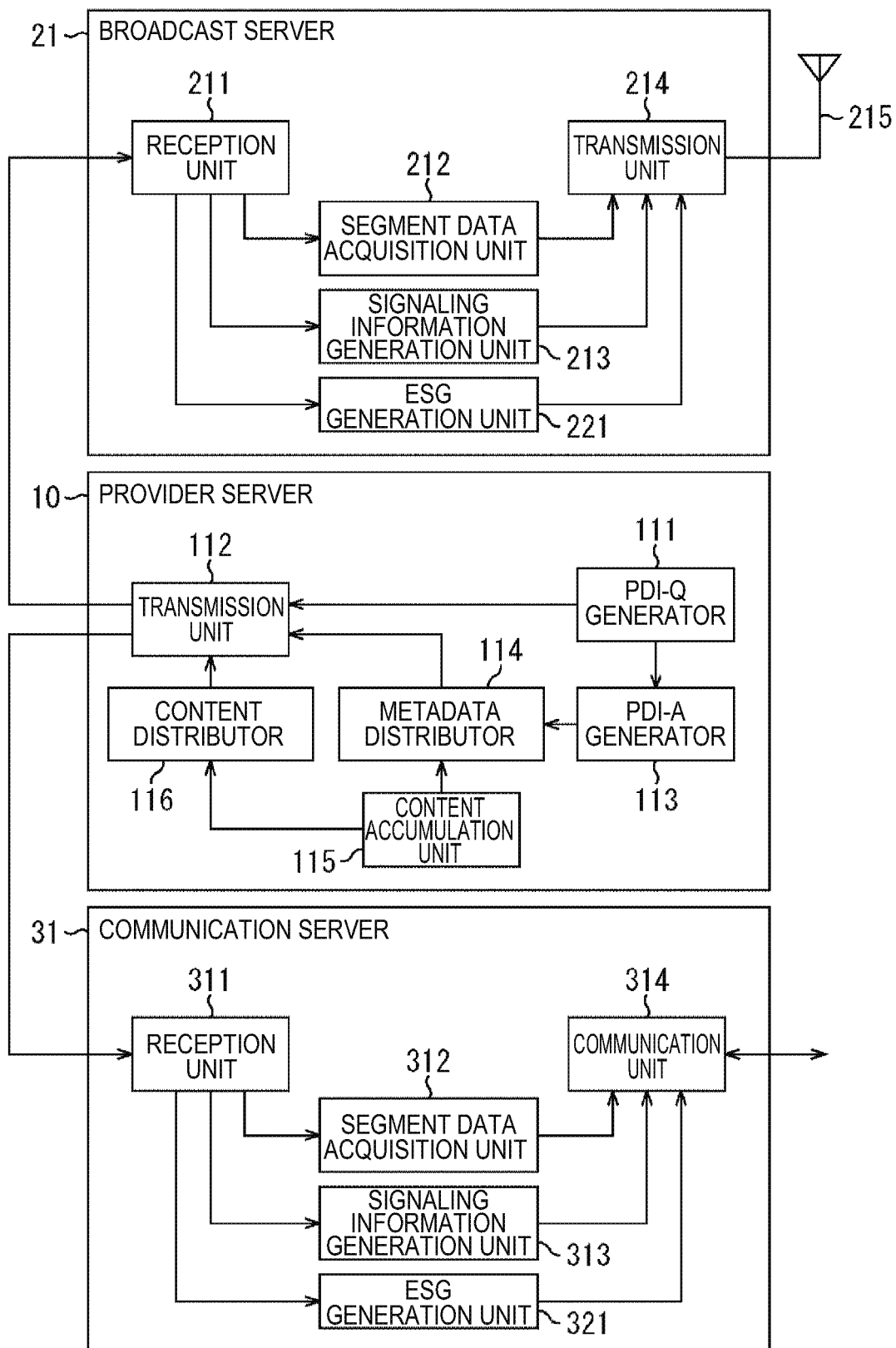
FIG. 30 is a diagram showing an example of configurations of servers.

FIG. 30 is a diagram showing an example of configurations of the servers of FIG. 29. Note that the same reference numerals are given to parts in FIG. 30 similar to those of the configurations of the servers of FIG. 19, and description thereof will be appropriately omitted.

In FIG. 30, the provider server 10 is constituted by a PDI-Q generator 111 to a content distributor 116, like the provider server 10 of FIG. 19, generates segment data of content, an MPD, a PDI-Q, and a provider-side PDI-A, and transmits them to the broadcast server 21 or the communication server 31 along with metadata of the content.

In FIG. 30, the broadcast server 21 is provided not only with a reception unit 211 to a transmission unit 214 but also with an ESG generation unit 221, unlike the broadcast server 20 of FIG. 19. The ESG generation unit 221 generates an ESG that includes at least one of the PDI-Q and the provider-side PDI-A based on the metadata of the content, the PDI-Q, the provider-side PDI-A received by the reception unit 211, and information for generating the ESG acquired from the various servers and the like, and supplies it to the transmission unit 214.

The transmission unit 214 modulates segment data, signaling information, and the ESG and then transmits them on a digital broadcast signal via an antenna 215.

The broadcast server 21 is configured as described above.

In FIG. 30, the communication server 31 is provided not only with a reception unit 311 to a communication unit 314 but also with an ESG generation unit 321, unlike the communication server 30 of FIG. 19. The ESG generation unit 321 generates an ESG that includes at least one of the PDI-Q and the provider-side PDI-A based on the metadata of the content, the PDI-Q, the provider-side PDI-A received by the reception unit 311, and information for generating the ESG acquired from the various servers and the like, and supplies it to the communication unit 314.

The communication unit 314 transmits segment data, signaling information, or the ESG to the client device 51 via the network 90 according to a request from the client device 51 for the segment data, the signaling information, or the ESG The communication server 31 is configured as described above.

Note that the devices on the transmission side of FIG. 30 may have the functional configuration shown in FIG. 30, and the provider server 10 and the broadcast server 21, or the provider server 10 and the communication server 31, for example, may be configured as one device. In addition, the functions of the communication server 31 providing the segment data, the signaling information, and the ESG may be separated from each other, and the segment data, the signaling information, and the ESG that includes at least one of the PDI-Q and the provider-side PDI-A may be provided from different servers.

(Example of Configuration of Device on Reception Side)

Figure 31:
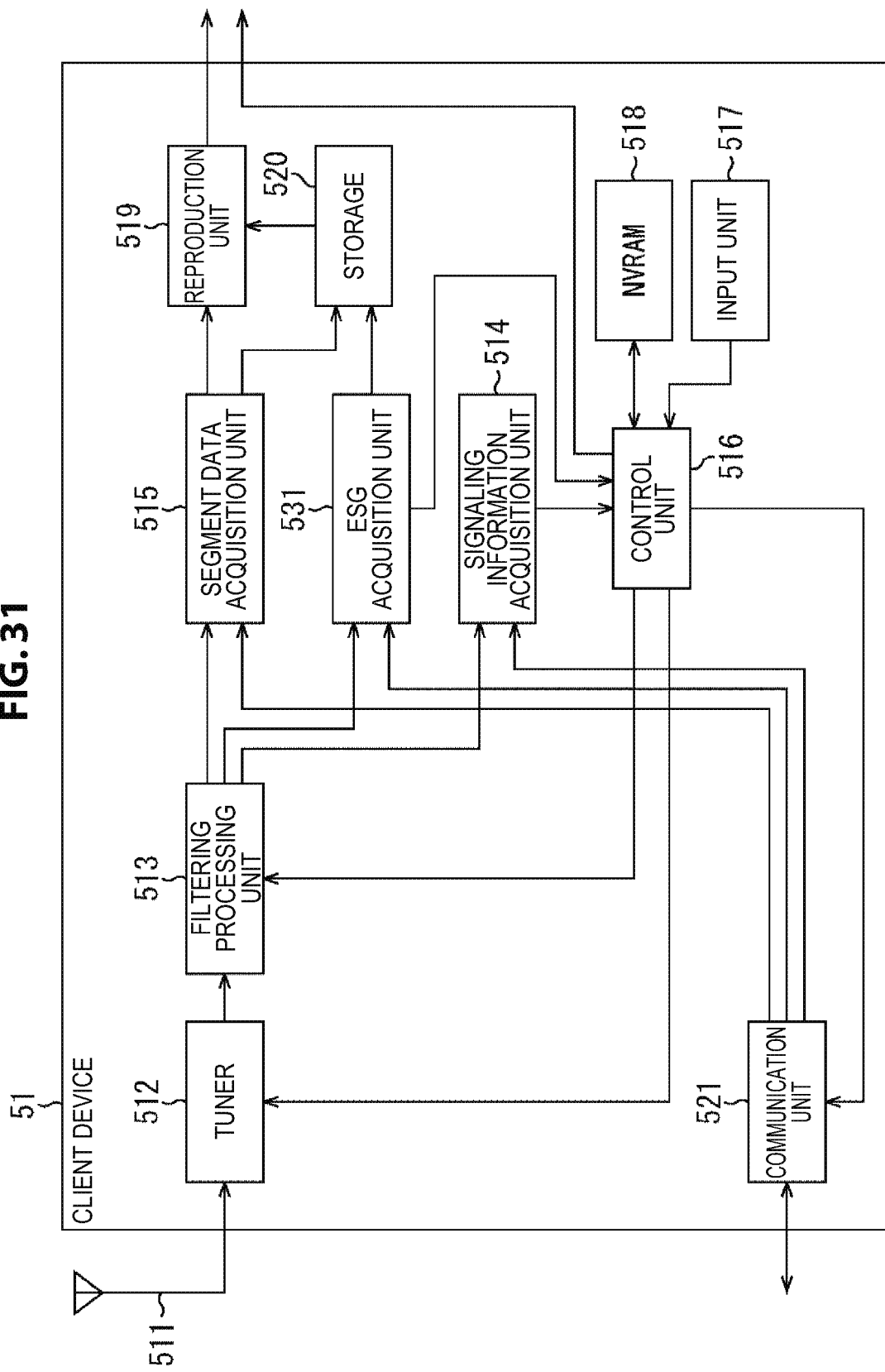
FIG. 31 is a diagram showing an example of a configuration of a client device.

FIG. 31 is a diagram showing an example of a configuration of the client device of FIG. 29. Note that the same reference numerals are given to parts of FIG. 31 similar to those of the configuration of the client device 50 of FIG. 20, and description thereof will be appropriately omitted.

In FIG. 31, the client device 51 is provided not only with a tuner 512 to a communication unit 521 but also with an ESG acquisition unit 531, unlike the client device 50 of FIG. 20. The ESG acquisition unit 531 acquires and processes an ESG obtained as a result of a filtering process by the filtering processing unit 513 or an ESG supplied from the communication unit 521, and saves it in the storage 520. Accordingly, the reproduction unit 519 reads the ESG saved in the storage 520 according to an operation of a user or the like, and causes the ESG as an electronic service guide to be displayed on a display.

In addition, the ESG acquisition unit 531 acquires a PDI-Q or a provider-side PDI-A included in the ESG and supplies it to the control unit 516. When the PDI-Q has been supplied from the ESG acquisition unit 531, the control unit 516 generates a client-side PDI-A based on the PDI-Q, and causes it to be saved in the NVRAM 518. In addition, when the provider-side PDI-A has been supplied from the ESG acquisition unit 531, the control unit 516 performs a matching process on the provider-side PDI-A and the client-side PDI-A saved in the NVRAM 518.

Then, when the PDI-As match as a result of the matching process of the PDI-As, the control unit 516 controls a filtering process executed by the filtering processing unit 513 based on an IP address, a port number, a TSI, a TOI, and the like obtained from SCS supplied from the signaling information acquisition unit 514 as signaling information. Accordingly, the client device 51 reproduces content according to the result of the matching process of the PDI-As.

(Example of Functional Configuration of Control Unit)

Figure 32:
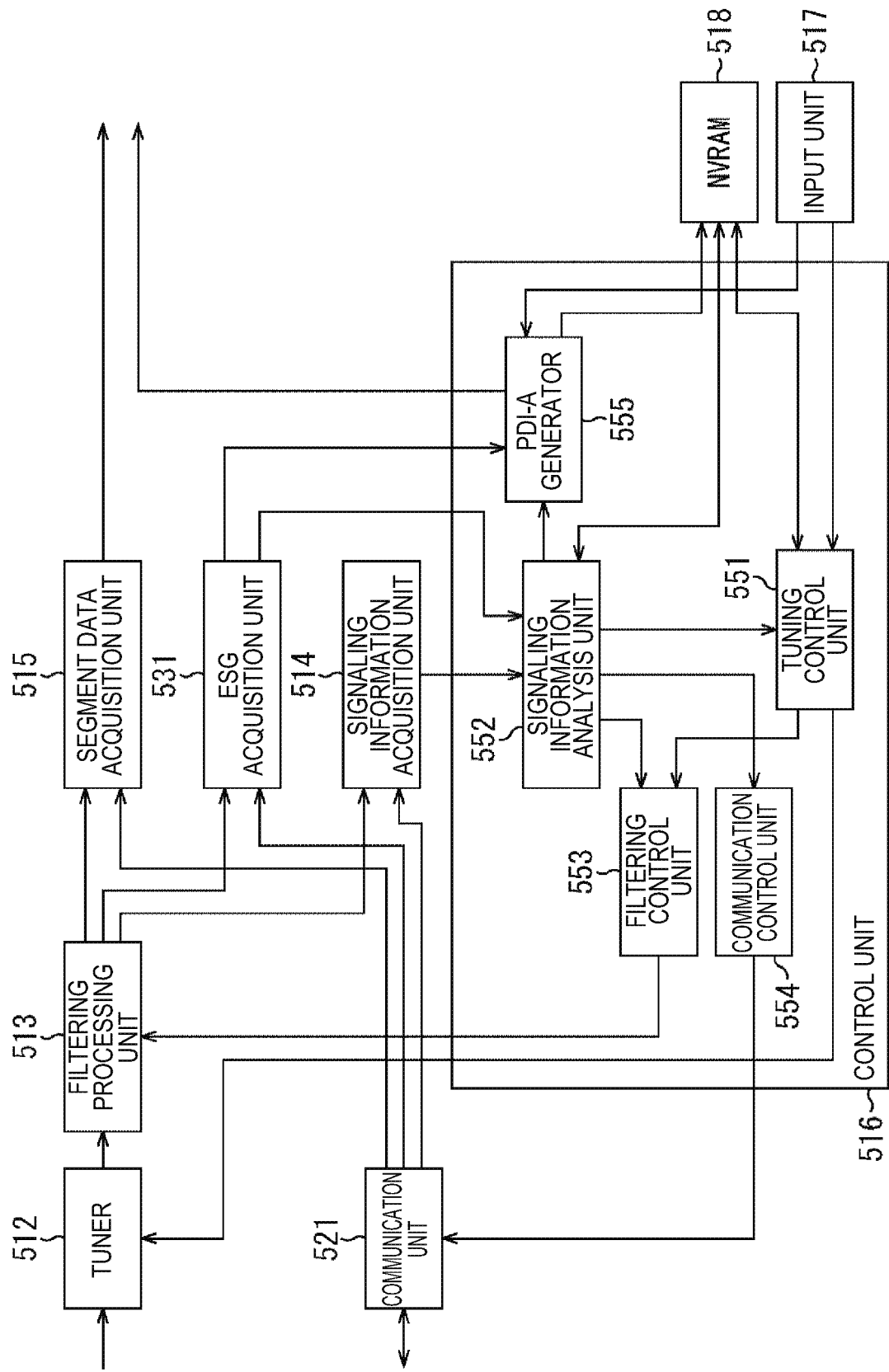
FIG. 32 is a diagram showing an example of a functional configuration of a control unit of the client device.

FIG. 32 is a diagram showing an example of a functional configuration of the part of the control unit 516 of FIG. 31 which controls an initial scanning process, a tuning process, the filtering process, a communication process, and the PDI-A matching process. Note that the same reference numerals are given to parts of FIG. 32 similar to those of the configuration of the control unit 516 of FIG. 21, and description thereof will be appropriately omitted.

In FIG. 32, the difference from the configuration of FIG. 21 is that the ESG acquisition unit 531 is added to the client device 51 of FIG. 31. The ESG acquisition unit 531 acquires the PDI-Q included in the ESG and supplies it to the PDI-A generator 555. In addition, the ESG acquisition unit 531 acquires the provider-side PDI-A included in the ESG and supplies it to the signaling information analysis unit 552.

The PDI-A generator 555 generates the client-side PDI-A based on the PDI-Q supplied from the ESG acquisition unit 531, and causes it to be saved in the NVRAM 518. For example, the PDI-A generator 555 causes the question described in the PDI-Q and options for an answer thereto to be displayed on the display (for example, the interactive display of FIG. 9), and then generates the client-side PDI-A according to the result of selection of an option for the answer of the user from the input unit 517 to the question.

The signaling information analysis unit 552 performs a matching process on the provider-side PDI-A supplied from the ESG acquisition unit 531 and the client-side PDI-A saved in the NVRAM 518. Then, when the PDI-As match as a result of the matching process, the signaling information analysis unit 552 specifies a distribution path of streams of target content based on the result of analysis of signaling information. In addition, when the PDI-As do not match as a result of the matching process of the PDI-As, the signaling information analysis unit 552 stops reproduction (accumulation) of the target content.

(3) Specific Flow of Processes of Devices

Next, a specific flow of processes of the respective devices constituting the broadcast communication system 2 of FIG. 29 will be described.

(Pre-Processing of Content Reproduction)

Pre-processing of content reproduction executed by the client device 51 prior to reproduction of the content has a flow similar to the flow of the pre-processing of content reproduction of FIG. 22 except for the fact that a PDI-Q that is supposed to be acquired with reference to an MPD is acquired with reference to an ESG That is, the client device 51 acquires the PDI-Q included in the ESG transmitted from the broadcast server 21, and generates and saves the client-side PDI-A based on the PDI-Q acquired from the ESG (Content Distribution/Reproduction Process)

Next, a flow of a content distribution/reproduction process executed by the respective devices constituting the broadcast communication system 2 of FIG. 29 will be described with reference to the flowchart of FIGS. 33 and 34.

Figure 33:
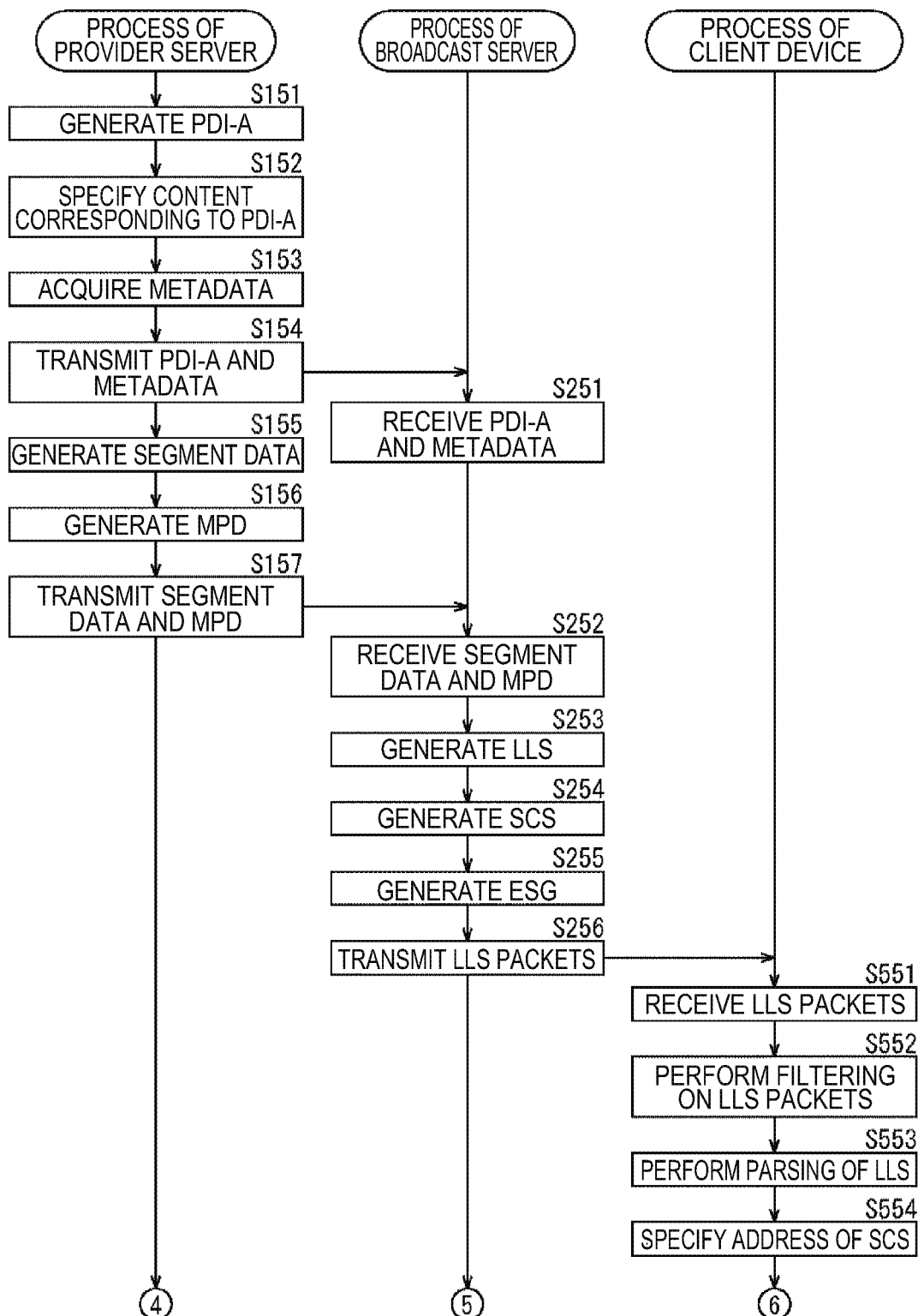
FIG. 33 is a flowchart describing a content distribution/reproduction process.

The provider server 10 executes processes of Steps S151 to S157 of FIG. 33. Specifically, in Step S151, the PDI-A generator 113 generates the provider-side PDI-A, as in Step S121 of FIG. 23. In addition, in Step S152, the metadata distributor 114 specifies (collates) content corresponding to an answer set by the provider side from content accumulated in the content accumulation unit 115 based on the provider-side PDI-A, as in Step S122 of FIG. 23.

In Step S153, the metadata distributor 114 acquires metadata with regard to the specified content or the like from metadata of the content accumulated in the content accumulation unit 115. In Step S154, the transmission unit 112 transmits the provider-side PDI-A and the metadata supplied from the metadata distributor 114 to the broadcast server 21.

In Step S155, the content distributor 116 generates segment data based on stream data of the content accumulated in the content accumulation unit 115 as in Step S125 of FIG. 23. In addition, in Step S156, the metadata distributor 114 generates an MPD based on the metadata of the content accumulated in the content accumulation unit 115. In Step S157, the transmission unit 112 transmits the segment data supplied from the content distributor 116 and the MPD supplied from the metadata distributor 114 to the broadcast server 21.

Figure 34:
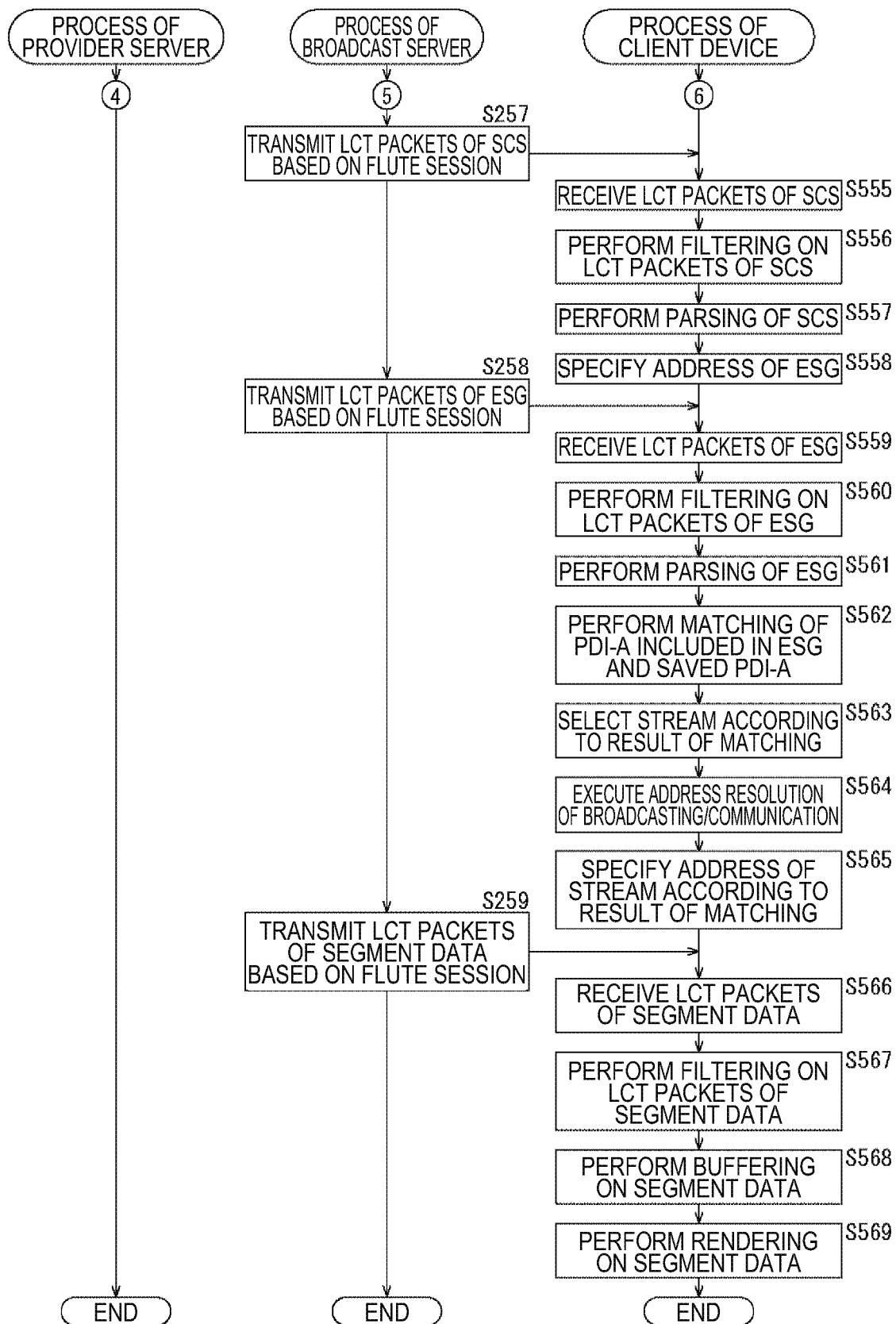
FIG. 34 is a flowchart describing the content distribution/reproduction process.

The broadcast server 21 executes processes of Steps S251 to S256 of FIG. 33 and Steps S257 to S259 of FIG. 34. Specifically, in Step S251, the reception unit 211 receives the provider-side PDI-A and the metadata transmitted from the provider server 10. In addition, in Step S252, the reception unit 211 receives the segment data and the MPD transmitted from the provider server 10.

In Step S253, the signaling information generation unit 213 generates signaling information of LLS as in Step S223 of FIG. 23. In addition, in Step S254, the signaling information generation unit 213 generates signaling information of SCS as in Step S224 of FIG. 23. In Step S255, the ESG generation unit 221 generates an ESG that includes a provider-side PDI-A based on the metadata of the content and the provider-side PDI-A received by the reception unit 211 and information for generating the ESG acquired from the various servers and the like, and supplies it to the transmission unit 214.

In Step S256, the transmission unit 214 transmits LLS packets on a digital broadcast signal via the antenna 215 as in Step S255 of FIG. 23. In addition, in Step S257, the transmission unit 214 transmits LCT packets of the SCS based on a FLUTE session on a digital broadcast signal using the IP transmission scheme via the antenna 215 as in Step S226 of FIG. 24.

In Step S258, the transmission unit 214 transmits LCT packets of the ESG based on the FLUTE session on a digital broadcast signal using the IP transmission scheme via the antenna 215. In addition, in Step S259, the transmission unit 214 transmits LCT packets of the segment data based on the FLUTE session on a digital broadcast signal using the IP transmission scheme via the antenna 215 as in Step S227 of FIG. 24. In this manner, the broadcast server 21 transmits the signaling information, the ESG including the provider-side PDI-A, and the segment data in the digital broadcasting using the IP transmission scheme.

The client device 51 executes processes of Steps S551 to S554 of FIG. 33 and Steps S555 to S569 of FIG. 34. Specifically, processes similar to those of Steps S521 to S527 of FIGS. 23 and 24 are performed in Steps S551 to S557.

That is, the client device 51 receives the LLS packets transmitted on the digital broadcast signal from the broadcast server 21, and performs a filtering process on the LLS packets. In addition, the client device 51 specifies an address of the SCS by performing parsing on the LLS, and performs a filtering process on the LCT packets of the SCS transmitted on the digital broadcast signal from the broadcast server 21. Then, the client device 51 performs parsing on the acquired SCS.

In Step S558, the signaling information analysis unit 552 specifies an address of the ESG based on ESG Bootstrap information included in the SCD. Here, the client device 51 receives the LCT packets of the ESG based on the FLUTE session (S559). In Step S560, the filtering processing unit 513 performs a filtering process on the LCT packets of the ESG according to control of the filtering control unit 553. Since LCT packets of the ESG are extracted through this filtering process, the ESG is acquired by performing parsing on the LCT packets, and is supplied to the ESG acquisition unit 531.

In Step S561, the ESG acquisition unit 531 performs parsing on the ESG to acquire the provider-side PDI-A included in the ESG and supplies it to the signaling information analysis unit 552. In Step S562, the signaling information analysis unit 552 performs a matching process on the provider-side PDI-A supplied from the ESG acquisition unit 531 and a client-side PDI-A saved in the NVRAM 518.

In Step S563, the signaling information analysis unit 552 selects a stream of content according to the result of the matching process of Step S562.

For example, when the provider-side PDI-A obtained from the ESG is the PDI-A of FIG. 11 and the client-side PDI-A saved in the NVRAM 518 is the PDI-A of FIG. 10, these PDI-As match and thus the stream of the target content, for example, is selected as a reproduction target (accumulation target). On the other hand, when the provider-side PDI-A obtained from the ESG is the PDI-A of FIG. 12 and the client-side PDI-A saved in the NVRAM 518 is the PDI-A of FIG. 10, for example, these PDI-As do not match, and thus the stream of the target content, for example, is not selected as a reproduction target (accumulation target).

In Steps S564 to S569, processes similar to those of Step S530 to S535 of FIG. 24 are performed. That is, the client device 51 executes address resolution of broadcasting or communication to specify an address (an IP address, a port number, a TSI, and a TOI) for acquiring the stream of the content according to the result of the matching process of Step S562. In addition, the client device 51 performs a filtering process on the LCT packets of the segment data based on the FLUTE session transmitted on the digital broadcast signal from the broadcast server 21.

Then, the client device 51 performs buffering and rendering on the segment data, and reproduces the content according to the result of the matching process of the PDI-As, i.e., content according to preference of a user. Note that the content according to the result of the matching process of the PDI-As may be accumulated in the storage 520 and reproduced later.

The content distribution/reproduction process has been described above. In this content distribution/reproduction process, the matching process of the provider-side PDI-A included in the ESG and the client-side PDI-A saved beforehand is performed, and the content according to the result of the matching process of the PDI-As, i.e., content according to preference of the user, can be reproduced. In addition, since PDI is employed, content to which metadata according to needs of that time is attached, other than metadata stipulated by the standard organization, can be reproduced.

Note that, although the example in which the PDI-As, content, and the like are distributed by the broadcast server 21 in multicast has been described in the content distribution/reproduction process of FIGS. 33 and 34 for the sake of convenience in description, the PDI-As, content, and the like may be distributed by the communication server 31 in unicast.

5. Modified Example

Note that, although the example in which the provider-side PDI-A is included in the MPD or the ESG has been described above, the provider-side PDI-A can be transmitted to be included in transmission information transmitted in an upper layer than the IP layer of the of the protocol layers of the IP transmission scheme. That is, the MPD and the ESG are an example of the transmission information, and the provider-side PDI-A can be included in a component serving as transmission information constituting content such as audio or a video, or a caption.

In addition, although the client-side PDI-A has been described to be saved in the NVRAM 518 of the client device 50 (51) in the above description, for example, a dedicated server for managing the client-side PDI-A may be provided on the network 90 to perform concentrated management. In this case, the client device 50 (51) accesses the dedicated server via the network 90 in the process of Step S516 of FIG. 22 to upload the client-side PDI-A, and accesses the dedicated server via the network 90 in the process of Step S528 of FIG. 24 (Step S562 of FIG. 34) to download the uploaded client-side PDI-A.

Note that, although "D" is used for an abbreviation of Description for a name of signaling information in above description, "T" that is an abbreviation for Table may be used. For example, a Service Configuration Description (SCD) may be described as a Service Configuration Table (SCT). In addition, for example, a Service Parameter Description (SPD) may be described as a Service Parameter Table (SPT). However, the difference between the names is merely a difference in the form between "Description" and "Table," and there is no difference in the substance of each piece of the signaling information.

6. Configuration of Computer

Figure 35:
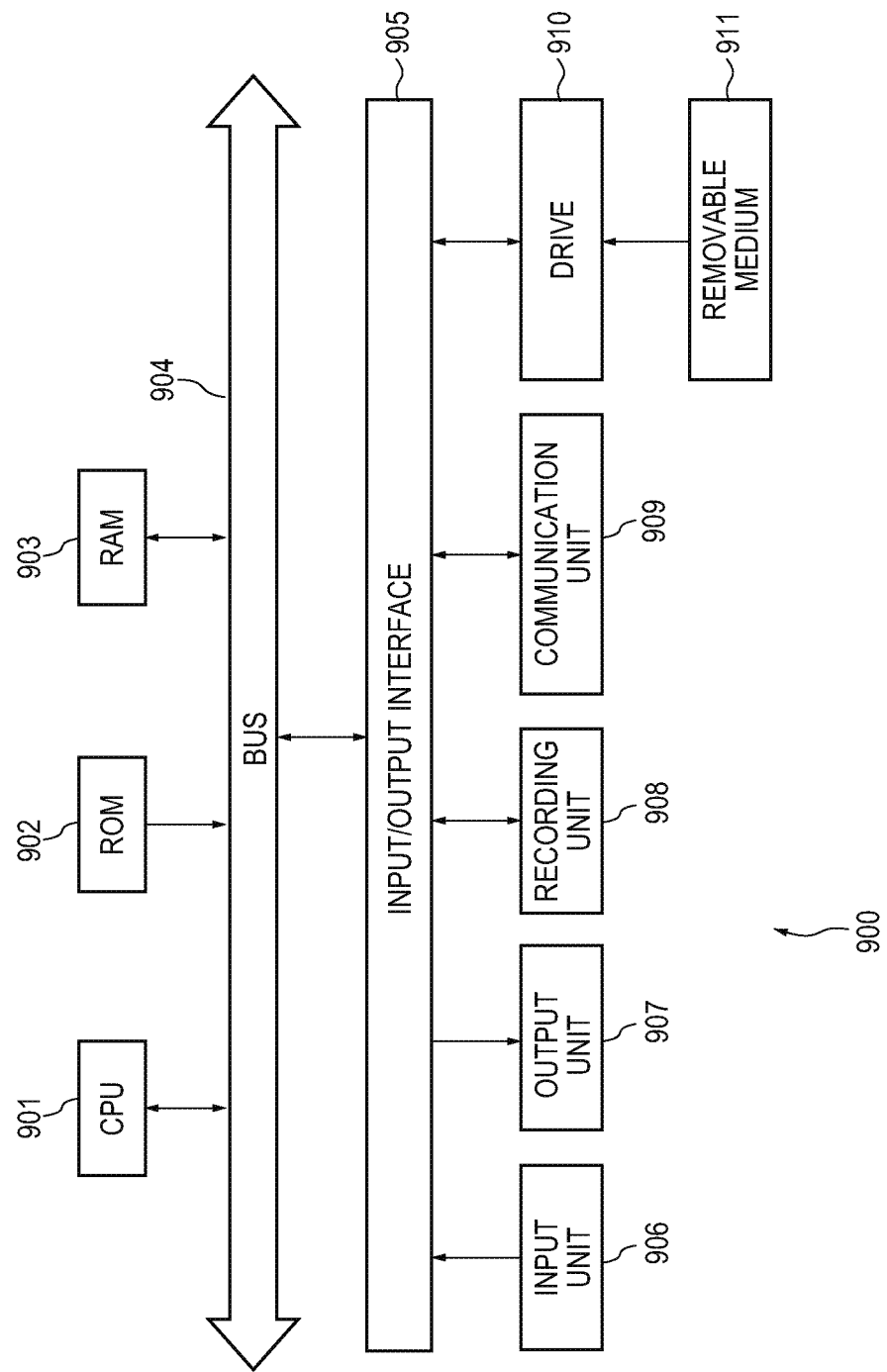
FIG. 35 is a diagram showing an example of a configuration of a computer.

The series of processes described above can be executed by hardware but can also be executed by software. When the series of processes is executed by software, a program that constructs such software is installed into a computer. FIG. 35 is a diagram showing an example of a hardware configuration of a computer that performs the above-described series of processing using a program.

In the computer 900, a central processing unit (CPU) 901, a read only memory (ROM) 902 and a random access memory (RAM) 903 are mutually connected by a bus 904. An input/output interface 905 is also connected to the bus 904. An input unit 906, an output unit 907, a recording unit 908, a communication unit 909, and a drive 910 are connected to the input/output interface 905.

The input unit 906 is configured with a keyboard, a mouse, a microphone, or the like. The output unit 907 is configured with a display, a speaker, or the like. The recording unit 908 is configured with a hard disk, a nonvolatile memory, or the like. The communication unit 909 is configured with a network interface, or the like. The drive 910 drives a removable medium 911 such as a magnetic disk, an optical disc, a magneto-optical disc, a semiconductor memory, or the like.

In the computer 900 configured as described above, the CPU 901 loads a program that is recorded in, for example, the ROM 902 or the recording unit 908 onto the RAM 903 via the input/output interface 905 and the bus 904, and executes the program. Thus, the above-described series of processing is performed.

Programs to be executed by the computer 900 (the CPU 901) are provided being recorded in the removable medium 911 which is a packaged medium or the like. Also, programs may be provided via a wired or wireless transmission medium, such as a local area network, the Internet, or digital satellite broadcasting.

In the computer 900, by loading the removable medium 911 into the drive 910, the program can be installed into the recording unit 908 via the input/output interface 905. It is also possible to receive the program from a wired or wireless transmission medium using the communication unit 909 and install the program into the recording unit 908. As another alternative, the program can be installed in advance into the ROM 902 or the recording unit 908.

Processes performed by the computer according to a program are not necessarily performed chronologically in the order described in a flowchart in the present specification. That is, processes performed by the computer according to a program also include processes performed in parallel or individually (for example, parallel processes or processes for an object). The program may be processed by one computer (processor) or by a plurality of computers in a distributed manner.

An embodiment of the present technology is not limited to the embodiments described above, and various changes and modifications may be made without departing from the scope of the present technology.

Additionally, the present technology may also be configured as below.

(1)

A reception device including:

a tuning control unit configured to perform tuning control for tuning digital broadcasting using an Internet Protocol (IP) transmission scheme; and an acquisition control unit configured to perform acquisition control for acquiring content transmitted in the digital broadcasting according to a result of a matching process on first answer information indicating an answer set by a provider that provides content to a question on preference of a user included in transmission information transmitted in an upper layer of an IP layer of protocol layers of the IP transmission scheme and second answer information indicating an answer set by the user to the question in the digital broadcasting.

(2)

The reception device according to (1), wherein the transmission information includes question information indicating the question on the preference of the user, and the reception device further includes an answer generation unit configured to generate the second answer information corresponding to the question information.

(3)

The reception device according to (1) or (2), wherein the transmission information is signaling information including control information of a stream of the content.

(4)

The reception device according to (3), wherein the signaling information corresponds to a Media Presentation Description (MPD) stipulated in a standard of Moving Picture Expert Group-Dynamic Adaptive Streaming over HTTP (MPEG-DASH).

(5)

The reception device according to (4), wherein the first answer information is designated in the MPD by an element that stipulates the substance of the first answer information or a reference source.

(6)
The reception device according to (5),
wherein the element that stipulates the substance of the first answer information or the reference source is an EssentialProperty element or a SupplementalProperty element stipulated in the MPD.

(7)
The reception device according to (1) or (2),
wherein the transmission information is program information with regard to the content.

(8)
The reception device according to (7),
wherein the program information corresponds to an Electronic Service Guide (ESG) stipulated in a standard of Open Mobile Alliance (OMA).

(9)
The reception device according to (8),
wherein the first answer information is stored in a newly stipulated element among elements constituting the ESG in at least one fragment of a Service fragment, a Schedule fragment, and a Content fragment.

(10)
A reception method of a reception device, the method including steps performed by the reception device, which are:
performing tuning control for tuning digital broadcasting using an Internet Protocol (IP) transmission scheme; and
performing acquisition control for acquiring content transmitted in the digital broadcasting according to a result of a matching process on first answer information indicating an answer set by a provider that provides content to a question on preference of a user included in transmission information transmitted in an upper layer of an IP layer of protocol layers of the IP transmission scheme and second answer information indicating an answer set by the user to the question in the digital broadcasting.

(11)
A transmission device including:
an acquisition unit configured to acquire content;
a transmission information generation unit configured to generate, as transmission information transmitted in an upper layer of an IP layer of protocol layers of an IP transmission scheme, the transmission information including first answer information that is first answer information indicating an answer set by a provider that provides the content to a question on preference of a user and is used in a matching process with second answer information indicating an answer set by the user to the question; and
a transmission unit configured to transmit the transmission information including the first answer information along with the content on a digital broadcast signal using the IP transmission scheme.

(12)
The transmission device according to (11),
wherein the transmission information generation unit generates the transmission information including question information indicating the question on the preference of the user, and
the transmission unit transmits the transmission information including the question information.

(13)
The transmission device according to (11) or (12),
wherein the transmission information is signaling information including control information of a stream of the content.

(14)
The transmission device according to (13),
wherein the signaling information corresponds to an MPD stipulated in a standard of MPEG-DASH.

(15)
The transmission device according to (14),
wherein the first answer information is designated in the MPD by an element that stipulates the substance of the first answer information or a reference source.

(16)
The transmission device according to (15),
wherein the element that stipulates the substance of the first answer information or the reference source is an EssentialProperty element or a SupplementalProperty element stipulated in the MPD.

(17)
The transmission device according to (11) or (12),
wherein the transmission information is program information with regard to the content.

(18)
The transmission device according to (17),
wherein the program information corresponds to an ESG stipulated in a standard of OMA.

(19)
The transmission device according to (18),
wherein the first answer information is stored in a newly stipulated element among elements constituting the ESG in at least one fragment of a Service fragment, a Schedule fragment, and a Content fragment.

(20)
A transmission method of a transmission device, the method including steps performed by the transmission device, which are:
acquiring content;
generating, as transmission information transmitted in an upper layer of an IP layer of protocol layers of an IP transmission scheme, the transmission information including first answer information that is first answer information indicating an answer set by a provider that provides the content to a question on preference of a user and is used in a matching process with second answer information indicating an answer set by the user to the question; and
transmitting the transmission information including the first answer information along with the content on a digital broadcast signal using the IP transmission scheme.

REFERENCE SIGNS LIST 1, 2 broadcast communication system
10 provider server
20, 21 broadcast server
30, 31 communication server
50, 51 client device
90 Internet
111 PDI-Q generator
113 PDI-A generator
114 metadata distributor
116 content distributor
212, 312 segment data acquisition unit
213, 313 signaling information generation unit
214 transmission unit
314 communication unit
221, 321 ESG generation unit
512 tuner
513 filtering processing unit
514 signaling information acquisition unit
515 segment data acquisition unit 516 control unit
518 NVRAM
519 reproduction unit
520 storage
521 communication unit
531 ESG acquisition unit
551 tuning control unit
552 signaling information analysis unit
553 filtering control unit
554 communication control unit
555 PDI-A generator
900 computer
901 CPU

The invention claimed is:

1. A reception device comprising:
processing circuitry configured to:
generate first preference demographic and interest (PDI) information, the first PDI information including a first question identifier identifying a first question and a first answer set by a user to the first question;
store, in a memory, the first PDI information;
perform an initial scanning process, including storing tuning information provided by received low layer signaling (LLS) information;
perform tuning control for tuning digital broadcasting using an Internet Protocol (IP) transmission scheme to receive signaling information and retrieve media presentation description (MPD) information from the received signaling information according to the tuning information, the signaling information being transmitted in a layer of the IP transmission scheme higher than another layer of the IP transmission scheme in which the LLS information is transmitted;
parse the retrieved MPD information to obtain second PDI information associated with a media file, the second PDI information including a second question identifier identifying a second question and a second answer set by a provider of the media file to the second question;
determine whether the first PDI information stored in the memory matches the second PDI information obtained by parsing the retrieved MPD information; and
in response to the first PDI information being determined as matching the second PDI information,
identify a user service description (USD) according to the retrieved MPD information,
determine a distribution path as the digital broadcasting or communication via a network according to the USD,
determine address information of the media file, and extract segment data of the media file from data packets transmitted over the determined distribution path and according to the determined address information.

2. The reception device according to claim 1,
wherein the MPD information complies with a standard of Moving Picture Expert Group-Dynamic Adaptive Streaming over HTTP (MPEG-DASH).

3. The reception device according to claim 2,
wherein the second PDI information is designated in the MPD by an element that specifies the substance of the second answer set by the provider to the second question or a reference source.

4. The reception device according to claim 3,
wherein the element that specifies the substance of the second answer set by the provider to the second question or the reference source is an EssentialProperty element or a SupplementalProperty element complying with the MPD.

5. The reception device according to claim 1,
wherein the MPD information includes program information with regard to the media file.

6. The reception device according to claim 5,
wherein the program information corresponds to an Electronic Service Guide (ESG) complying with a standard of Open Mobile Alliance (OMA).

7. The reception device according to claim 6,
wherein the second PDI information is stored in an element among elements constituting the ESG in at least one fragment of a Service fragment, a Schedule fragment, and a Content fragment.

8. A reception method of a reception device, the method comprising:
generating, by processing circuitry of the reception device, first preference demographic and interest (PDI) information, the first PDI information including a first question identifier identifying a first question and a first answer set by a user to the first question;
storing, in a memory, the first PDI information;
performing an initial scanning process, including storing tuning information provided by received low layer signaling (LLS) information;
performing, by the processing circuitry, tuning control for tuning digital broadcasting using an Internet Protocol (IP) transmission scheme to receive signaling information and retrieve media presentation description (MPD) information from the received signaling information according to the tuning information, the signaling information being transmitted in a layer of the IP transmission scheme higher than another layer of the IP transmission scheme in which the LLS information is transmitted;
parsing, using the circuitry, the retrieved MPD information to obtain second PDI information associated with a media file, the second PDI information including a second question identifier identifying a second question and a second answer set by a provider of the media file to the second question;
determining, by the processing circuitry, whether the first PDI information stored in the memory matches the second PDI information obtained by parsing the retrieved MPD information; and
in response to the first PDI information being determined as matching the second PDI information,
identifying a user service description (USD) according to the retrieved MPD information,
determining a distribution path as the digital broadcasting or communication via a network according to the USD,
determining address information of the media file, and
extracting, by the processing circuitry, segment data of the media file from data packets transmitted over the determined distribution path and according to the determined address information.

9. A transmission device comprising:
processing circuitry configured to:
obtain provider-side preference demographic and interest (PDI) information associated with a media file, the provider-side PDI information including a first question identifier identifying a first question and a first answer set by a provider of a media file to the first question, the provider-side PDI information being used by a reception device in a matching process with client-side PDI information, the client-side PDI information including a second question identifier identifying a second question and a second answer set by the user to the second question for determining whether to extract segment data of the media file according to address information of the media file;

dispose the provider-side PDI information in media presentation description (MPD) information;

transmit low layer signaling (LLS) information that provides tuning information;

transmit signaling information including the MPD via digital broadcasting that is subject to tuning control performed according to the tuning information provided by the LLS information, the signaling information being transmitted in a layer of an IP transmission scheme higher than another layer of the IP transmission scheme in which the LLS information is transmitted, the MPD information including the provider-side PDI information along with the address information of the media file; and transmit a user service description (USD) identifiable according to the MPD information and transmit the segment data of the media file in data packets over the digital broadcasting or communication via a network as indicated in the USD.

10. The transmission device according to claim 9, wherein the MPD information complies with a standard of Moving Picture Expert Group-Dynamic Adaptive Streaming over HTTP (MPEG-DASH).

11. The transmission device according to claim 10, wherein the provider-side PDI information is designated in the MPD by an element that specifies the substance of the first answer set by the provider to the first question or a reference source.

12. The transmission device according to claim 11, wherein the element that specifies the substance of the first answer set by the provider to the first question or the reference source is an EssentialProperty element or a SupplementalProperty element complying with the MPD.

13. The transmission device according to claim 9, wherein the MPD information includes program information with regard to the media file.

14. The transmission device according to claim 13, wherein the program information corresponds to an Electronic Service Guide (ESG) complying with a standard of Open Mobile Alliance (OMA).

15. The transmission device according to claim 14, wherein the provider-side PDI information is stored in an element among elements constituting the ESG in at least one fragment of a Service fragment, a Schedule fragment, and a Content fragment.

16. A transmission method of a transmission device, the method comprising:
obtaining, by circuitry of the transmission device, provider-side preference demographic and interest (PDI) information including a first question identifier identifying a first question and a first answer set by a provider of a media file to the first question, the provider-side PDI information being used by a reception device in a matching process with client-side PDI information, the client-side PDI information including a second question identifier identifying a second question and a second answer set by the user to the second question for determining whether to extract segment data of the media file according to address information of the media file;

disposing, by the circuitry, the provider-side PDI information in media presentation description (MPD) information;

transmitting low layer signaling (LLS) information that provides tuning information;

transmitting signaling information including the MPD via digital broadcasting that is subject to tuning control performed according to the tuning information provided by the LLS information, the signaling information being transmitted in a layer of an IP transmission scheme higher than another layer of the IP transmission scheme in which the LLS information is transmitted, the MPD information including the provider-side PDI information along with the address information of the media file; and transmitting a user service description (USD) identifiable according to the MPD information and transmitting the segment data of the media file in data packets over the digital broadcasting or communication via a network as indicated in the USD.

17. The reception device according to claim 1, wherein the processing circuitry is further configured to:
receive the first question from the provider of the media file via the digital broadcasting.

18. The reception method according to claim 8, wherein the MPD information complies with a standard of Moving Picture Expert Group-Dynamic Adaptive Streaming over HTTP (MPEG-DASH).

* * * * *